United States Patent
Hasegawa et al.

(10) Patent No.: US 7,106,664 B2
(45) Date of Patent: Sep. 12, 2006

(54) OPTICAL HEAD AND INFORMATION STORAGE DEVICE

(75) Inventors: Shin-ya Hasegawa, Kawasaki (JP); Fumihiro Tawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 63 days.

(21) Appl. No.: 11/047,185

(22) Filed: Jan. 31, 2005

(65) Prior Publication Data

US 2005/0157393 A1     Jul. 21, 2005

Related U.S. Application Data

(63) Continuation of application No. PCT/JP02/11834, filed on Nov. 13, 2002.

(51) Int. Cl.
*G11B 7/135* (2006.01)
*G02B 1/10* (2006.01)

(52) U.S. Cl. .............................. 369/13.33; 369/112.01; 359/586

(58) Field of Classification Search ............. 369/13.33, 369/112.01; 359/586; G11B 7/135, 11/00; G02B 1/10
See application file for complete search history.

(56) References Cited

FOREIGN PATENT DOCUMENTS

| JP | 09-326130   | 12/1997 |
|----|-------------|---------|
| JP | 10-302291   | 11/1998 |
| JP | 11-328713   | 11/1999 |
| JP | 2001-66240  | 3/2001  |
| JP | 2001-134972 | 5/2001  |
| JP | 2002-184036 | 6/2002  |

*Primary Examiner*—A. M. Psitos
(74) *Attorney, Agent, or Firm*—Greer, Burns & Crain, Ltd

(57) ABSTRACT

An optical head including a first dielectric layer having a first refractive index, a pair of second dielectric layers located adjacent to the first dielectric layer on both sides thereof, each of the second dielectric layers having a second refractive index larger than the first refractive index, a pair of third dielectric layers located adjacent to the second dielectric layers, and a pair of fourth dielectric layers located adjacent to the third dielectric layers, each of the fourth dielectric layers having a third refractive index larger than the first refractive index. Light is incident on the optical head in a direction orthogonal to a layering direction of the first to fourth dielectric layers. The first dielectric layer and each of the third dielectric layers have different refractive indices or different thicknesses.

17 Claims, 23 Drawing Sheets

Z DIRECTION

X DIRECTION

Y DIRECTION

Z DIRECTION

OPTICAL HEAD AND INFORMATION STORAGE DEVICE

This is a continuation of International PCT Application No. PCT/JP02/11834, filed Nov. 13, 2002, which was not published in English.

BACKGROUND OF THE INVENTION

1. Field of the Invention

The present invention relates to an optical head and an information storage device using the optical head.

2. Description of the Related Art

With the evolution of information society, the amount of information is increasing more and more. In response to such an increasing amount of information, it is desired to develop an information recording method capable of recording information at a very high recording density and a recording/reproducing device based on this information recording method. In an optical disk drive as one kind of information recording/reproducing device, a focused beam diameter related to a recording capacity is limited by the wavelength of light. As measures for increasing the recording density in the optical disk drive, shortening of the wavelength of laser to be used and increasing of the numerical aperture (NA) of an optical lens are known. However, there is a limit to high-density recording due to the diffraction limit. As means for increasing the numerical aperture of an optical lens, there has been proposed a method of using a solid immersion lens to increase the numerical aperture to not less than 1 and utilizing evanescent light leaked from the bottom surface of the solid immersion lens to record information on an optical disk medium. However, this method naturally has a limit to high-density recording because the NA is increased by the refractive index of the solid immersion lens.

As a recording method for realization of high-density recording, attention is focused on a near-field optical recording method such that a minute opening smaller than the wavelength of incident light is formed to utilize near-field light generated from this minute opening, thereby forming a beam spot smaller than the wavelength of the incident light. As a structure (near-field light probe) for generating the near-field light, a pointed optical fiber (optical fiber probe) having a minute opening smaller than the wavelength of light is widely used. Such an optical fiber probe is fabricated by drawing one end of an optical fiber with heat or using chemical etching to thereby point the one end of the optical fiber and next coating the pointed optical fiber except the tip thereof with metal. By introducing light into this optical fiber, near-field light can be generated near the minute opening formed at the tip of the pointed optical fiber. However, this optical fiber probe has a disadvantage such that the light use efficiency is low. For example, when the diameter of the minute opening is 100 nm, the ratio of the intensity of light emerging from the tip of the optical fiber to the intensity of incident light entering the optical fiber is 0.001% or less.

As means for improving the light use efficiency, the following probes have been proposed.

(1) Multistep Pointed Fiber Probe

This probe is an optical fiber probe such that the tapering angle of the tip of the optical fiber is stepwise changed from the root to the tip in two or three steps (Applied Physics Letters, Vol. 68, No. 19, p2612–2614, 1996; Applied Physics letters, Vol. 73, No. 15, p2090–2092, 1998).

(2) Metal Stylus Probe

The stylus of a scanning tunneling microscope (STM) is used as a probe. By irradiating the tip of the stylus with light, intense near-field light is generated near the tip of the stylus (Japanese Patent Laid-open No. Hei 6-137847).

(3) Minute Opening Fiber Probe with Microscopic Metal Ball

This fiber probe is a fiber probe such that a microscopic metal ball is formed at the center of the minute opening at the tip of an optical fiber. Plasmon is excited in the microscopic metal ball by means of light emerging from the minute opening, thereby generating intense near-field light near the metal ball (Japanese Patent Laid-open No. Hei 11-101809).

(4) Glass Piece Probe Coated with Metal

A metal film having a thickness of about 50 nm is formed on a glass piece cut into a triangular prism to excite surface plasmon on the metal film. The surface plasmon propagates toward the apex of the triangular prism to thereby generate intense near-field light near the apex (Physical Review B, Vol. 55, No. 12, p7977–7984, 1997).

(5) Glass Substrate Probe with Metal Scattering Member

This probe is a probe having a glass substrate and a metal scattering member attached to the bottom surface of the glass substrate. Intense near-field light is generated near the metal scattering member (Japanese Patent Laid-open No. Hei 11-250460).

In a near-field optical system, the spacing between a minute structure for generating near-field light and the surface of a sample must be set to several nanometers to tens of nanometers. Accordingly, in the case of using a probe configured by an optical fiber or a glass piece as mentioned above, a special control system is required to control the spacing between the tip of the probe and the sample surface. In general, the spacing is measured by using an interatomic force acting between the probe tip and the sample, and servo control is performed by using a measured value for the spacing. However, in the case of utilizing this servo control, a probe scanning speed is limited because there is a limit to a servo band. Particularly in an optical recording/reproducing device required to have a high data transfer rate, the probe must be scanned over an optical disk at a high speed, and high-frequency spacing variations due to warpage or inclination of the optical disk cannot be controlled by the above servo control method.

To solve this problem, the following probes have been proposed.

(1) Planar opening probe

This probe has a minute opening formed in a silicon substrate by anisotropic etching. Since a peripheral portion about the minute opening is flat, the spacing can be kept constant by pressing the probe on the sample (The Pacific Rim Conference on Lasers and Electro-Optics, WL2, 199).

(2) Opening probe with pad

A quadrangular pyramidal projection having a minute opening at the tip is formed on the bottom surface of a glass substrate, and a pad is formed around the projection. The spacing between the probe tip and the sample can be kept constant by the pad (Japanese Patent Laid-open No. Hei 11-265520).

(3) Surface emitting laser probe with metal minute projection

A metal minute opening and a metal minute projection are formed on the light emitting end surface of a surface emitting laser. Since the minute structure is flat, the spacing can be kept constant by pressing the probe on the sample (Applied Physics, Vol. 68, No. 12, p1380–1383, 1999). It is expected that the light use efficiency can also be improved because of the metal minute projection and the resonance structure.

(4) A patch antenna and a coaxial cable are applied to light, thereby generating near-field light with a high efficiency (Optics Communications Vol. 69, No. 3, 4, p219–224, 1989).

(5) A bow-tie metal piece is used as a minute dipole antenna to thereby generate minute near-field light with a high efficiency (U.S. Pat. No. 5,696,372).

As the performance of an optical memory using near-field light, the following three points are required.
(a) The spacing between the minute structure and the recording medium is controlled precisely on the order much smaller than the wavelength of light.
(b) The beam spot is minute.
(c) The light use efficiency is high, that is, high-speed data transfer is allowed.

The fiber probe having a pointed end whose tapering angle is multi-stepwise changed has a high efficiency 10 to 100 times that of a general fiber probe. However, the efficiency of this fiber probe is yet insufficient in the case of application to an optical recording/reproducing device required to have a light use efficiency of 0.5% or more. Further, since an optical fiber is used, the fiber probe is mechanically brittle and high-speed scanning is therefore impossible. All of the metal stylus probe, the minute opening fiber probe with microscopic metal ball, the glass piece probe coated with metal, and the glass substrate probe with metal scattering member utilize the characteristics of metal to improve the efficiency, and a high light use efficiency can be expected. However, the probe tip in each probe is mechanically brittle in shape, so that each probe is not fit for high-speed scanning. In particular, the metal stylus probe and the glass substrate probe with metal scattering member have a disadvantage such that background light is largely detected because light not applied to the tip of the stylus or the scattering member is also incident on the sample.

As mentioned above, various probes capable of scanning at high speeds have been proposed. However, in the case of the planar opening probe and the opening probe with pad, high-speed scanning is allowed, but the light use efficiency is low. By using a model such that a tapering angle of 30° for the minute opening is formed in an aluminum substrate having a thickness of 560 nm, that the diameter of the minute opening is set to 100 nm, and that light having a wavelength of 400 nm is incident, precise electromagnetic calculation was performed by an FDTD (Finite Difference Time Domain) method. As shown in FIG. 1, in the case that a beam is incident on the metal minute opening having a diameter of 100 nm, the beam diameter in a near-field region just after emergence from the minute opening becomes 160 nm (full width at half maximum) larger than the opening size, and the beam profile has an angular shape especially in the polarization direction of the incident light. Accordingly, high-density recording is difficult.

In the surface emitting laser probe with metal minute projection, it is expected that high-speed scanning is allowed, that the light use efficiency is high, and that the background light is less detected. In the case of generating intense near-field light by using the metal minute projection, the shape of such a metal member must be optimized. However, such shape optimization is not disclosed in Japanese Patent Laid-open No. Hei 11-101809. Further, a manufacturing method for such a metal member is also not disclosed in this publication.

In the method of applying a patch antenna and a coaxial cable to light to thereby generate near-field light with a high efficiency or in the method of using a bow-tie metal piece as a minute dipole antenna to thereby generate minute near-field light with a high efficiency, the light intensity is amplified by using a plasmon resonance condition due to the free electrons of metal. FIG. 2 shows the result of precise electromagnetic calculation by the FDTD method in this case as similar to the above. As apparent from FIG. 2, unless a recording surface is placed within a distance of 2 to 3 nm from the bow-tie antenna plane, the effect of light intensity amplification becomes the same as that in a perfect conductor not using plasmon amplification. That is, the light intensity amplification is not observed and a necessary light quantity of 0.5% or more cannot be obtained. Further, an allowable value for the shape of the bow-tie antenna that can satisfy the plasmon condition is small.

There has been reported a method of increasing a recording density by including a lens-shaped substrate in an optical disk medium (Optical Data Storage 2001 Technical Digest pp277–279, Guerra et al., Apr. 22–25, 2001). The object of this method is to solve the problems on dust, head disk interface, etc., and information is recorded/reproduced to/from a recording film by using light focused by a microlens included in the optical disk medium rather than by using near-field light. The recording density can be increased by increasing the refractive index of the lens material. However, there is a limit to increasing of the refractive index, and the recording density in the circumferential direction of the disk cannot be improved.

SUMMARY OF THE INVENTION

It is therefore an object of the present invention to provide an optical head using near-field light which can attain a high light use efficiency and high-speed scanning.

It is another object of the present invention to provide an information recording/reproducing device which can attain high-density recording by using the above optical head.

In accordance with an aspect of the present invention, there is provided an optical head including a first dielectric layer having a first refractive index; a pair of second dielectric layers located adjacent to the first dielectric layer on both sides thereof, each of the second dielectric layers having a second refractive index larger than the first refractive index; a pair of third dielectric layers located adjacent to the second dielectric layers; and a pair of fourth dielectric layers located adjacent to the third dielectric layers, each of the fourth dielectric layers having a third refractive index larger than the first refractive index. Light is incident on the optical head in a direction orthogonal to a layering direction of the first to fourth dielectric layers.

Preferably, the first dielectric layer and each of the second dielectric layers have different refractive indices. More preferably, each of the third dielectric layers has a fourth refractive index smaller than the first refractive index. Alternatively, the first dielectric layer and each of the third dielectric layers have different thicknesses. Preferably, each of the third dielectric layers has a thickness larger than that of the first dielectric layer. Preferably, the incident light is linearly polarized light having a polarization plane in a direction orthogonal to the layering direction of the first to fourth dielectric layers.

In accordance with another aspect of the present invention, there is provided an optical head including a first dielectric layer; a pair of first metal layers located adjacent to the first dielectric layer on both sides thereof, each of the first metal layers having a negative dielectric constant; a pair of second dielectric layers located adjacent to the first metal layers; and a pair of second metal layers located adjacent to the second dielectric layers, each of the second metal layers having a negative dielectric constant. The first dielectric layer and each of the second dielectric layers have different refractive indices or different thicknesses. Light is incident on the optical head in a direction orthogonal to a layering direction of the first and second dielectric layers and the first and second metal layers.

Preferably, the first dielectric layer has a first refractive index, and each of the second dielectric layers has a second refractive index larger than the first refractive index. Alternatively, the first dielectric layer has a first thickness, and each of the second dielectric layers has a second thickness larger than the first thickness. Preferably, the incident light is linearly polarized light having a polarization plane in a direction orthogonal to the layering direction of the first and second dielectric layers and the first and second metal layers.

In accordance with a further aspect of the present invention, there is provided a cylindrical optical head including a first dielectric located at the center of the optical head, the first dielectric having a first refractive index; a ringlike second dielectric located adjacent to the first dielectric on the outer circumferential side thereof, the second dielectric having a second refractive index larger than the first refractive index; a ringlike third dielectric located adjacent to the second dielectric on the outer circumferential side thereof; and a ringlike fourth dielectric located adjacent to the third dielectric on the outer circumferential side thereof, the fourth dielectric having a third refractive index larger than the first refractive index. Light is incident on the optical head in the axial direction thereof.

The ringlike second dielectric may be replaced by a ringlike first metal member having a negative dielectric constant, and the ringlike fourth dielectric may be replaced by a ringlike second metal member having a negative dielectric constant.

In accordance with a still further aspect of the present invention, there is provided an information storage device for recording/reproducing information to/from a recording medium, including a light source for emitting a light beam; and an optical head for irradiating the recording medium with light based on the light beam; the optical head including a first dielectric layer having a first refractive index; a pair of second dielectric layers located adjacent to the first dielectric layer on both sides thereof, each of the second dielectric layers having a second refractive index larger than the first refractive index; a pair of third dielectric layers located adjacent to the second dielectric layers; and a pair of fourth dielectric layers located adjacent to the third dielectric layers, each of the fourth dielectric layers having a third refractive index larger than the first refractive index. Light is incident on the optical head in a direction orthogonal to a layering direction of the first to fourth dielectric layers.

In accordance with a still further aspect of the present invention, there is provided an information storage device for recording/reproducing information to/from a recording medium, including a light source for emitting a light beam; and an optical head for irradiating the recording medium with light based on the light beam; the optical head including a first dielectric layer; a pair of first metal layers located adjacent to the first dielectric layer on both sides thereof, each of the first metal layers having a negative dielectric constant; a pair of second dielectric layers located adjacent to the first metal layers; and a pair of second metal layers located adjacent to the second dielectric layers, each of the second metal layers having a negative dielectric constant. The first dielectric layer and each of the second dielectric layers have different refractive indices or different thicknesses. Light is incident on the optical head in a direction orthogonal to a layering direction of the first and second dielectric layers and the first and second metal layers.

The above and other objects, features, and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
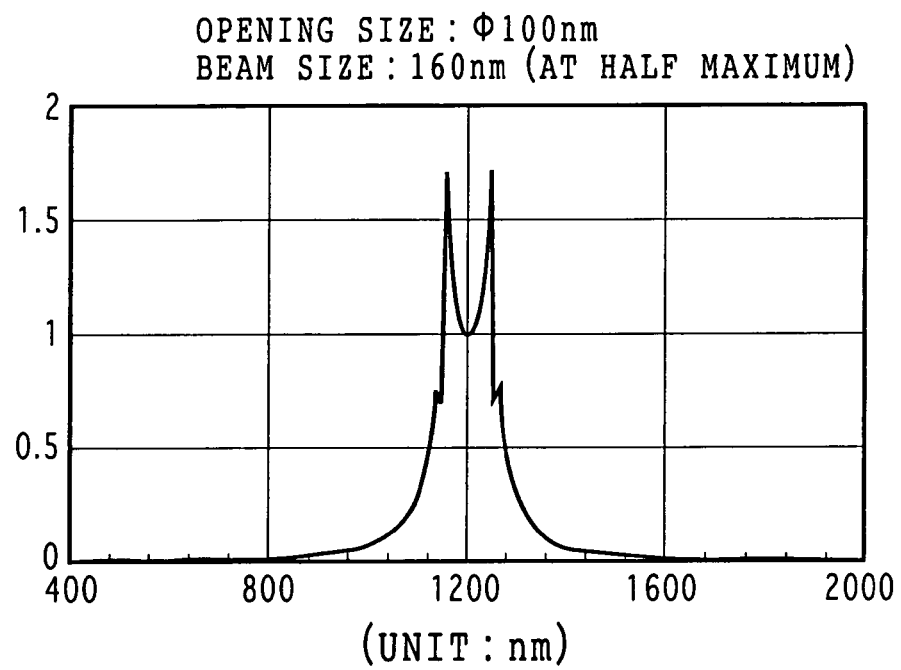
FIG. 1 is a graph for illustrating a problem in the conventional minute opening method.
Figure 2:
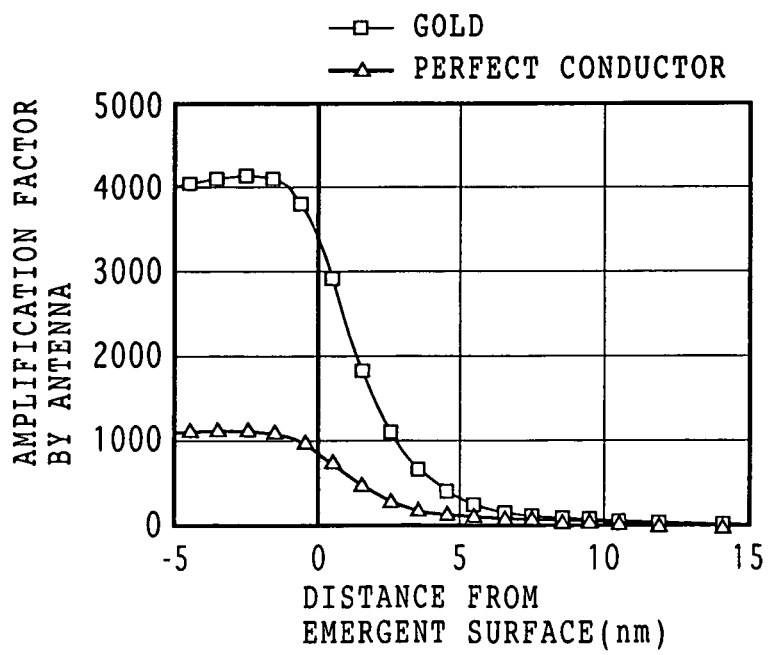
FIG. 2 is a graph for illustrating a problem in the conventional bow-tie antenna method.

To generate minute light, it is considered to use a minute opening in two dimensions or use a single slit in one dimension. In the case that such an opening or slit has a size (e.g., about 100 nm) less than or equal to the wavelength of light, the light passing through the opening or slit is very weak. Under these circumstances, the present inventors have focused attention on periodically formed diffraction gratings. When the difference between a high refractive index and a low refractive index is very large, a specific behavior is sometimes exhibited to the transmission of light. However, the behavior of light under such a circumstance has not yet been investigated in detail. Attention has been paid to the use of wide-gap semiconductors in the III–V group, for example, as a material having a high refractive index.

In the case of a transmission type diffraction grating, when the length (pitch) of the period of diffraction gratings is larger than the wavelength of incident light, a light beam incident on the plural diffraction gratings is fully transmitted or diffracted. Accordingly, the transmitted light as a light beam necessarily becomes a beam having many crests and troughs in a near field, and the beam becomes largely blurred in a far field. Accordingly, to obtain a minute light beam having a size less than or equal to the diffraction limit, there has been proposed a method of covering the entire surface of a diffraction grating with a metal or the like and forming a minute opening having a size (e.g., about 200 nm) less than or equal to the wavelength of light to be used and less than or equal to the diffraction limit at one position in the metal by using a focused ion beam or the like. Thus, plasmon excited light by the metal diffraction grating is emerged from the minute opening.

However, this method has some problems such that the use efficiency of the light emerged from the opening is low, that the machining by the focused ion beam is not fit for mass production, and that the size and shape of the opening formed by using the focused ion beam are unstable. Further, this method is not fit for the manufacture of optical devices from a wafer for mass production at low costs.

The present invention has an advantage such that a beam much smaller than the diffraction limit can be generated with a high efficiency without forming an opening by using a focused ion beam. The present inventors have first found by calculation that an optical element having a special periodic structure such that the number of periods is very small and that the components forming these periods are different can transmit light in a region smaller in size than the wavelength of light without attenuation but with an increase in intensity.

There will now be described a method of using a refractive index difference between a medium having a high refractive index and a medium having a low refractive index, so as to confine light. In the following description, a blue laser diode (wavelength: 400 nm) is used as a laser for use in optical recording or reproduction. Silicon (Si) is used as the material having a high refractive index, and the refractive index of Si at a wavelength of 400 nm is 5.56. On the other hand, diamond is used as the material having a low refractive index, and the refractive index of diamond at a wavelength of 400 nm is 2.47. Accordingly, the refractive index difference is 3.1, which is a very large value. As will be hereinafter described, the behavior of light in this case becomes a specific phenomenon called anomaly.

When the length (pitch) d of the period of diffraction gratings is less than or equal to a wavelength λ (exclusive of 0), no diffracted light is generated. If the period becomes smaller, the fabrication of diffraction gratings is difficult, so that this phenomenon has not yet been investigated in detail. However, the present inventors have found by calculation that transmitted light is emerged without attenuation by further reducing the period length d, e.g., less than or equal to λ/5 (exclusive of 0). More specifically, the present inventors have found by calculation such an anomaly that transmitted light is intensively emerged by forming diffraction gratings including a medium having a first refractive index and a medium having a second refractive index higher than the first refractive index, and setting the length of the period of the diffraction gratings to a value less than or equal to an operating wavelength and less than or equal to a certain period length, and that almost no transmitted light is emerged when the length of the period of the diffraction gratings becomes less than or equal to the operating wavelength and greater than the certain period length.

In consideration of these phenomena, a central portion for light confinement is formed in a range less than or equal to a certain period length (exclusive of 0) by combining a first dielectric having a first refractive index located at the center and a pair of second dielectrics each having a refractive index higher than the first refractive index located adjacent to the first dielectric on both sides thereof. Further, a pair of side portions are formed adjacent to the above central portion on both sides thereof in a range greater than the above certain period length by combining a pair of third dielectrics each having a second refractive index and a pair of fourth dielectrics each having a refractive index higher than the second refractive index. With this arrangement, no transmitted light is generated from the side portions adjacent to the central portion, but light is confined in the central portion. This transmitted light as 0-th order diffracted light is intensively propagated in the diffraction gratings without attenuation. The present invention is characterized in that such light confinement can be realized with a small number of periods, e.g., three periods.

In the following calculation on light, precise electromagnetic field calculation was performed by the FDTD method.

The number of cells in the X and Z directions was 120 for each, and the size of each cell was set to 10 nm. The number of cells in the Y direction was 240, and the size of each cell was set to 5 nm. The result of calculation was utilized in the case that the number of periods was 30 in a sufficiently steady state. Further, to make the solution stable even in the case of metal as a negative dielectric, the Lorentz equation of motion of free electrons as a free-electron model for metal was calculated simultaneously with the FDTD method to thereby obtain an accurate solution.

Figure 3:
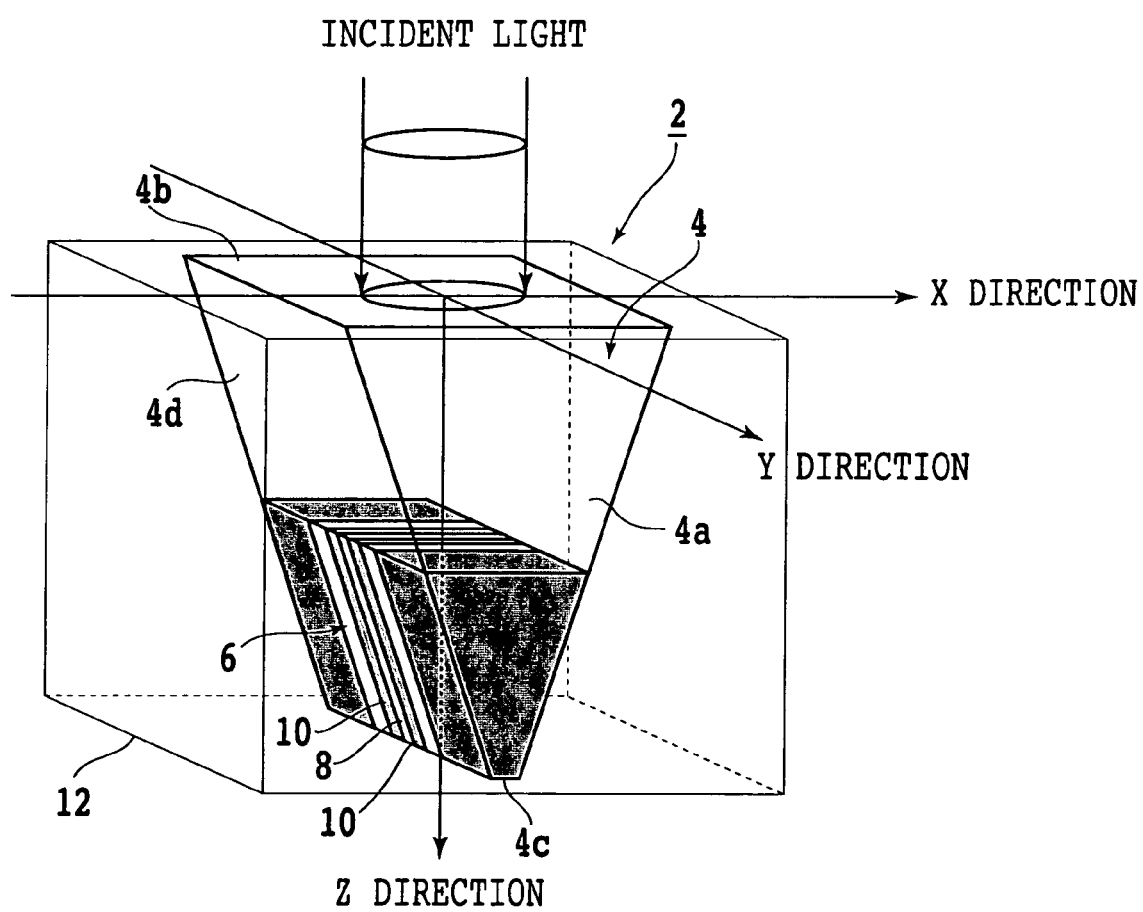
FIG. 3 is a perspective view of an optical head according to a first preferred embodiment of the present invention.

Referring now to FIG. 3, there is shown a schematic perspective view of an optical head 2 according to a first preferred embodiment of the present invention. The optical head 2 includes a trapezoidal prism 4 having a pair of trapezoidal principal surfaces 4a parallel to each other, a rectangular bottom surface 4b, a rectangular top surface 4c parallel to the rectangular bottom surface 4b, and a pair of inclined side surfaces 4d connecting the top surface 4c, the bottom surface 4b, and the principal surfaces 4a together. The trapezoidal prism 4 is formed of diamond having a refractive index of 2.47, which is transparent to the light to be used. In the trapezoidal prismatic optical head, blue light as linearly polarized light having a polarization plane in the X direction is incident on the rectangular bottom surface 4b, and multiple reflection of the light occurs on the side surfaces 4d to cause interference, thereby reducing the size of the beam both in the X direction and in the Y direction, particularly in the X direction (see Japanese Patent Application No. 2002-188579).

The thickness of the trapezoidal prism 4 in the Y direction is 600 nm, the apex angle at the top of the trapezoidal prism 4 is 30°, and the length of the trapezoidal prism 4 in the Z direction as a traveling direction of incident light is 1.4 µm. A light confining portion 6 is formed near the top of the trapezoidal prism 4. As will be hereinafter described in detail, the light confining portion 6 is composed of a diamond layer 8 located at the center and a pair of Si layers 10 located adjacent to the diamond layer 8 on both sides thereof. To further reduce the beam diameter, the dielectric forming the light confining portion is covered with a material (e.g., metal) having a negative dielectric constant at the operating wavelength, thereby obtaining an effect similar to apparent increasing of the refractive index of the dielectric. Accordingly, the trapezoidal prism 4 is surrounded by an aluminum (Al) layer 12. The real part of the dielectric constant of aluminum at the operating wavelength is −23.38, and the dielectric constant of diamond is 6.1. Accordingly, the condition for plasmon excitation is satisfied, that is, the condition that the absolute value of the real part of the dielectric constant of a material having a negative dielectric constant at the operating wavelength is larger than the dielectric constant of the dielectric adjacent to this material is satisfied.

Figure 4:
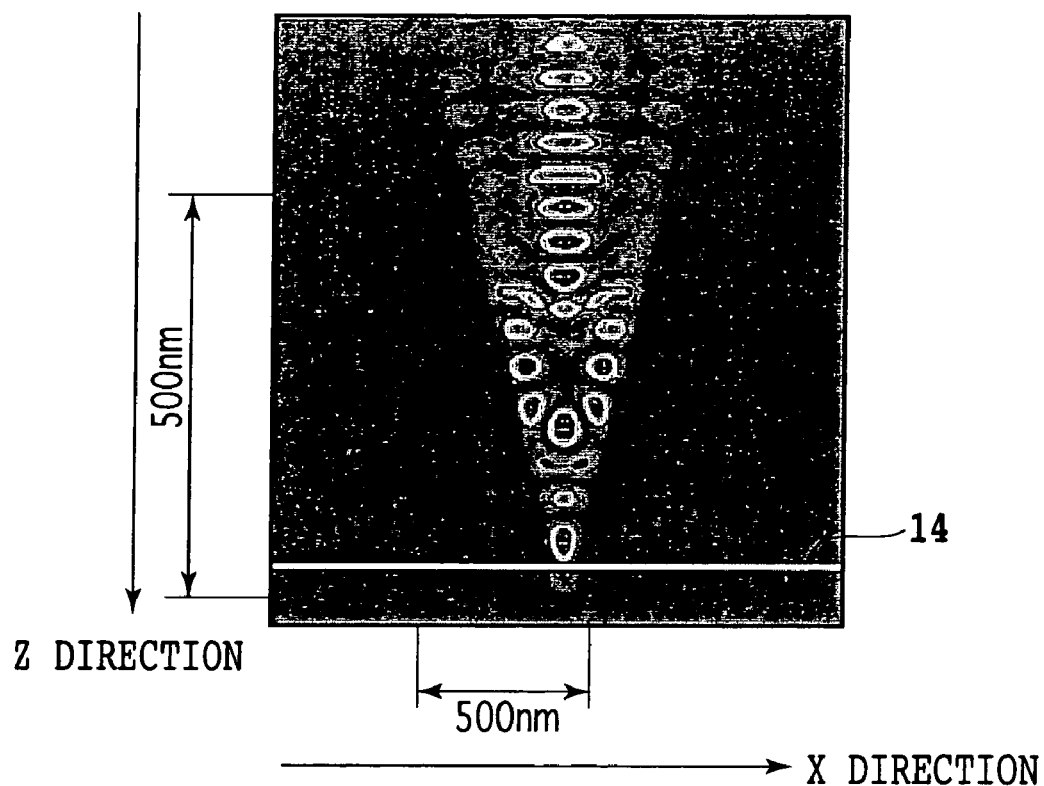
FIG. 4 is a computer simulation image in the X direction when light is incident on a diamond trapezoidal prism having no light confining portion near the top.
Figure 5:
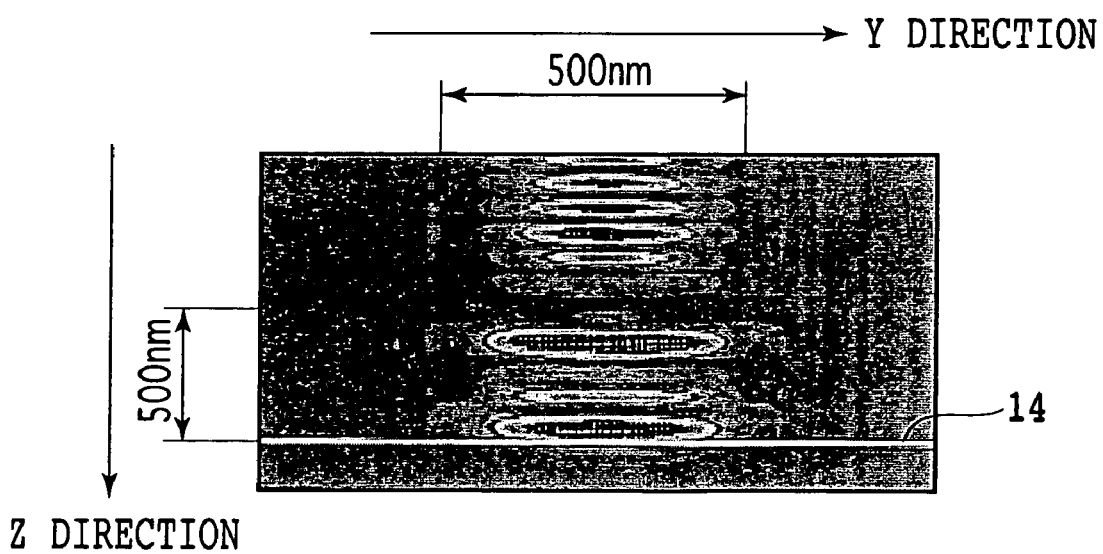
FIG. 5 is a computer simulation image in the Y direction when light is incident on a diamond trapezoidal prism having no light confining portion near the top.

FIGS. 4 and 5 show computer simulation images of propagation of light incident on a diamond trapezoidal prism excluding the light confining portion 6 near the top. More specifically, FIG. 4 shows the propagation in the X direction, and FIG. 5 shows the propagation in the Y direction. As shown in FIGS. 4 and 5, interference of light occurs both in the X direction and in the Y direction. A light emerging surface 14 is selected so that the light most interferes at this surface 14 to thereby reduce the beam size. The beam size for a light intensity of $1/e^2$ at a distance of 10 nm from the light emerging surface 14 is 100 nm in the X direction and 600 nm in the Y direction. Thus, the beam size in the X direction is reduced by the interference effect, but it is necessary to further reduce the beam size in the Y direction.

The present invention is effective in reducing the beam size in one direction. That is, the beam size in the Y direction can be reduced without hindering the converging property in the X direction by utilizing the beam confinement in the periodic structure with a small number of periods according to the present invention.

Figure 6:
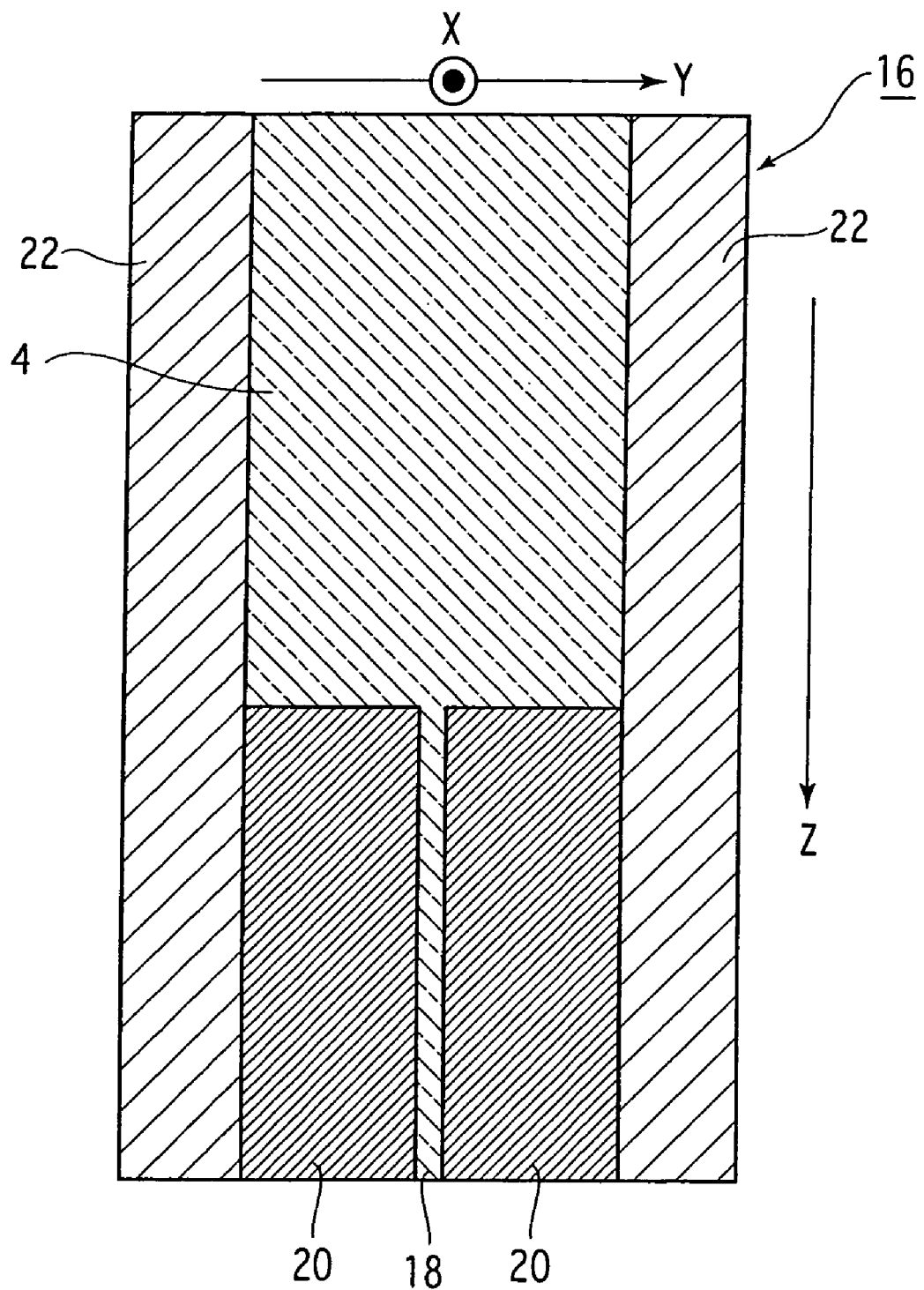
FIG. 6 is a sectional view of a trapezoidal prismatic optical head having only one light transmitting portion at the center as a comparison.
Figure 7:
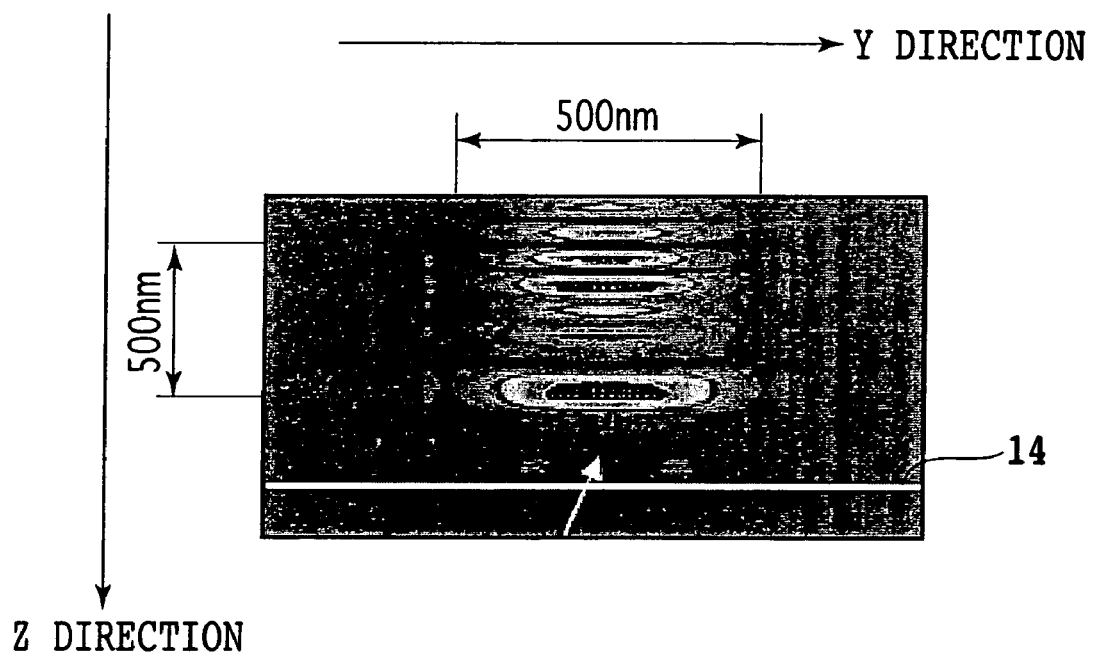
FIG. 7 is a computer simulation image in the Y direction when light is incident on the optical head shown in FIG. 6.

FIG. 6 is a sectional view of a trapezoidal prismatic optical head 16 having only one light transmitting portion (slit or opening) 18 at the center as a comparison. As similar to the preferred embodiment shown in FIG. 3, the optical head 16 includes a trapezoidal prism 4 formed of diamond. The light transmitting portion 18 at the center of a light emerging portion is formed of diamond as in the trapezoidal prism 4. The thickness of the light transmitting portion 18 is 25 nm. A pair of Si layers 20 are formed adjacent to the light transmitting portion 18 on both sides thereof. The trapezoidal prism 4 and the Si layers 20 are surrounded by an Al layer 22 having a thickness of 200 nm. The propagation of light in this optical head 16 is shown by a computer simulation image in FIG. 7. As shown in FIG. 7, the light cannot be transmitted through the slit 18 whose thickness is less than the operating wavelength, so that no light is emerged from the light emerging surface 14.

Figure 8:
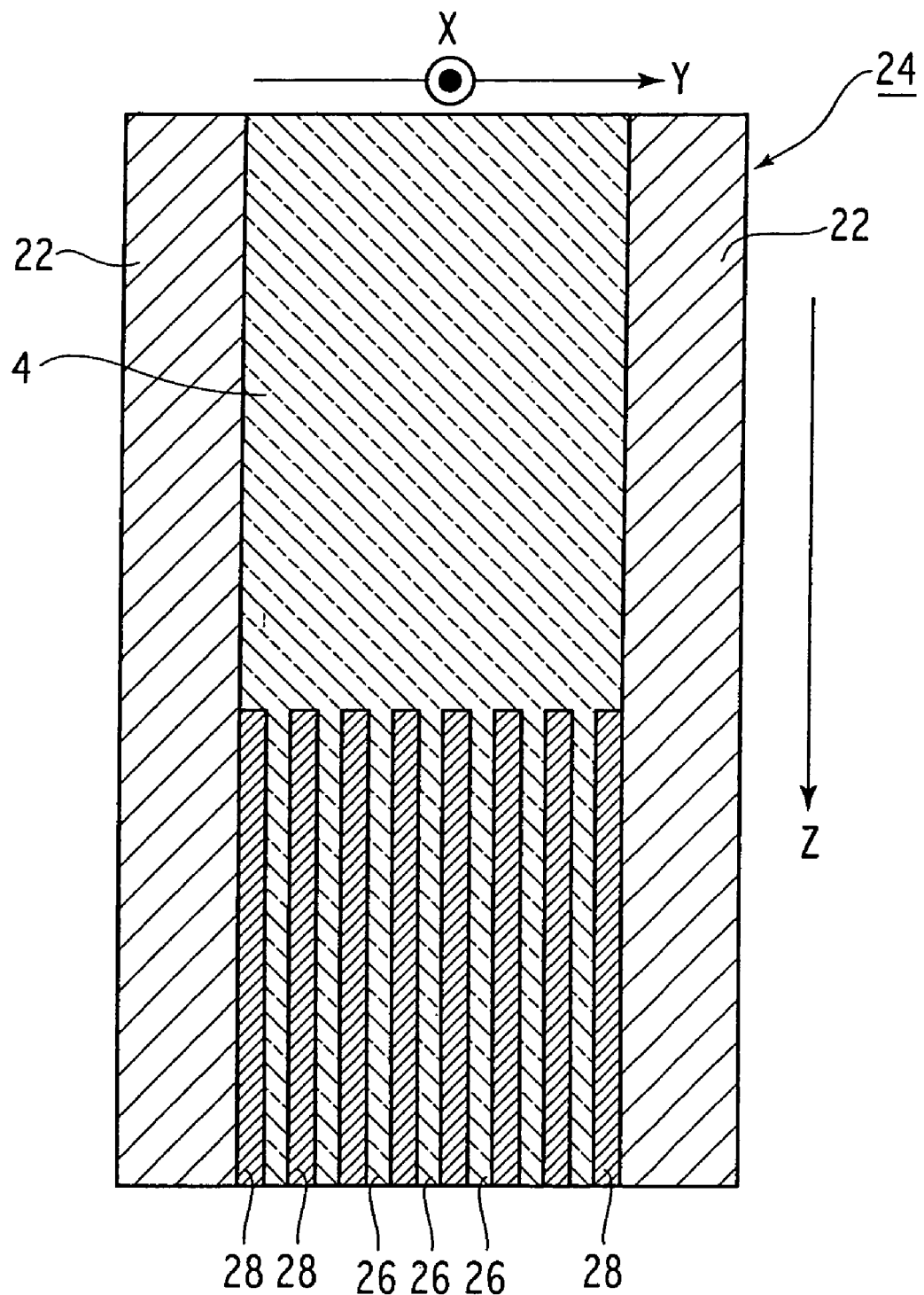
FIG. 8 is a sectional view of a trapezoidal prismatic optical head having a plurality of light transmitting portions as another comparison.
Figure 9:
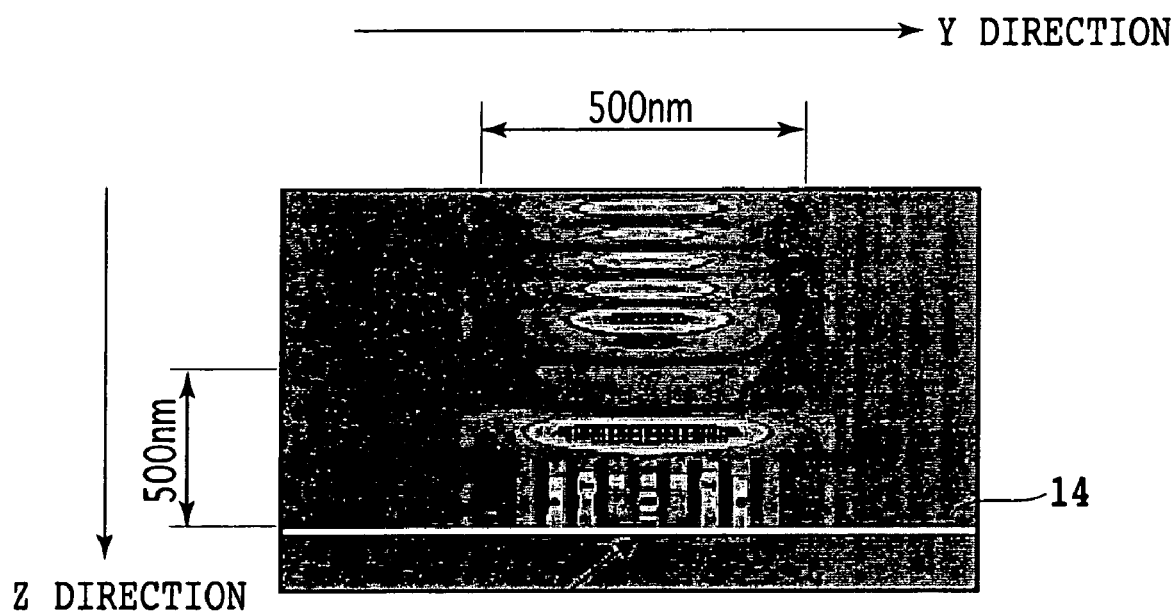
FIG. 9 is a computer simulation image in the Y direction when light is incident on the optical head shown in FIG. 8.

Referring to FIG. 8, there is shown a sectional view of a trapezoidal prismatic optical head 24 as another comparison. The optical head 24 includes a trapezoidal prism 4 formed of diamond. A plurality of slits 26 and a plurality of Si layers 28 are alternately arranged in such a manner that each slit 26 is sandwiched between the adjacent Si layers 28. Each slit 26 has a thickness of 25 nm, and each Si layer 28 also has a thickness of 25 nm. Each slit 26 is formed of diamond. The trapezoidal prism 4 and the Si layers 28 are surrounded by an Al layer 22 having a thickness of 200 nm. FIG. 9 shows a computer simulation image in the case that light is incident on the optical head 24. As apparent from FIG. 9, the light can be transmitted through the plural slits 26 each having a thickness of 25 nm without attenuation. However, many fine beams are undesirably emerged from the light emerging surface 14.

It has also been found by similar electromagnetic field calculation that when the periodic spacing in the multilayer periodic structure shown in FIG. 8 is enlarged, the light cannot be transmitted through the light transmitting portion (opening). The following phenomenon has been found from the result of the above calculation. The central light confining portion is formed by combining a central dielectric layer having a low refractive index as the light transmitting portion (opening) and a pair of dielectric layers located adjacent to the central dielectric layer, each dielectric layer having a high refractive index. Further, the pitch of the other diffraction gratings is increased, or the refractive indices of the other diffraction gratings are made different from each other. With this configuration, a fine light beam having a size less than or equal to the operating wavelength can be confined in the central light confining portion, so that this single fine beam is emerged from the light emerging surface.

Figure 10:
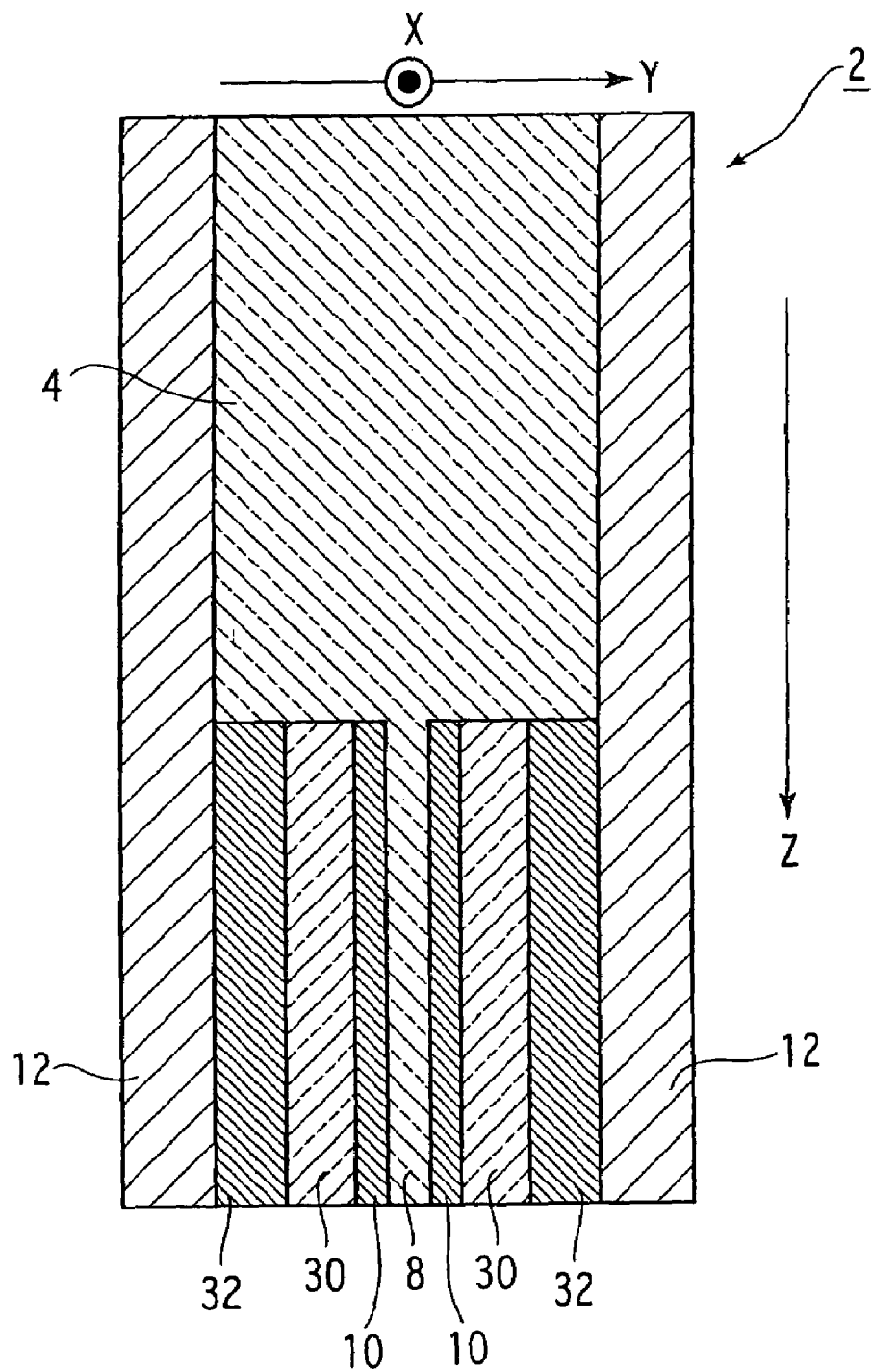
FIG. 10 is a sectional view of the optical head according to the first preferred embodiment as taken in the Y direction.

FIG. 10 shows a sectional view of the optical head 2 taken in the Y direction according to the first preferred embodiment shown in FIG. 3. A first dielectric layer 8 as the central light transmitting portion (opening) is formed of diamond as in the trapezoidal prism 4, and has a thickness of 20 nm. A pair of second dielectric layers 10 formed of Si are located adjacent to the first dielectric layer 8 on both sides thereof, and each second dielectric layer 10 has a thickness of 25 nm. Further, a pair of third dielectric layers 30 formed of $SiO_2$ are located adjacent to the second dielectric layers 10, and each third dielectric layer 30 has a thickness of 40 nm.

Further, a pair of fourth dielectric layers 32 formed of Si are located adjacent to the third dielectric layers 30, and each fourth dielectric layer 32 has a thickness of 120 nm. The trapezoidal prism 4 and the fourth dielectric layers 32 are surrounded by an Al layer 12 having a thickness of 200 nm. The length of the multilayer structure in the Z direction is 100 nm. The first dielectric layer 8 and the third dielectric layers 30 are transparent to the light to be used.

Figure 11:
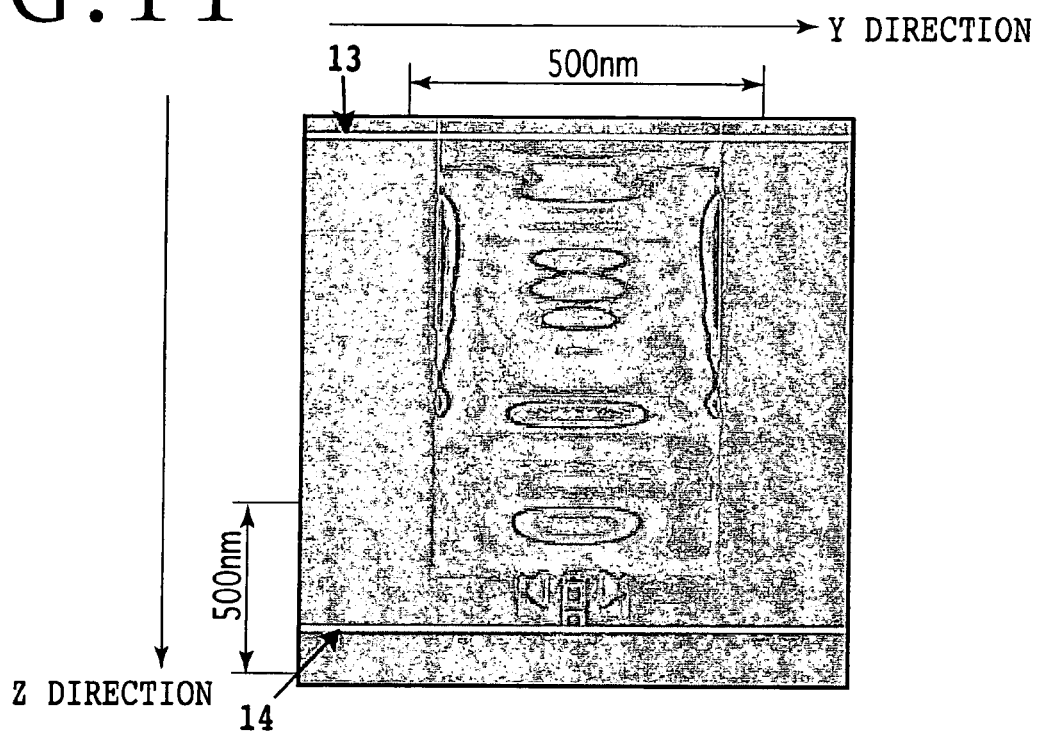
FIG. 11 is a computer simulation image in the Y direction when light is incident on the optical head according to the first embodiment of the present invention.
Figure 12:
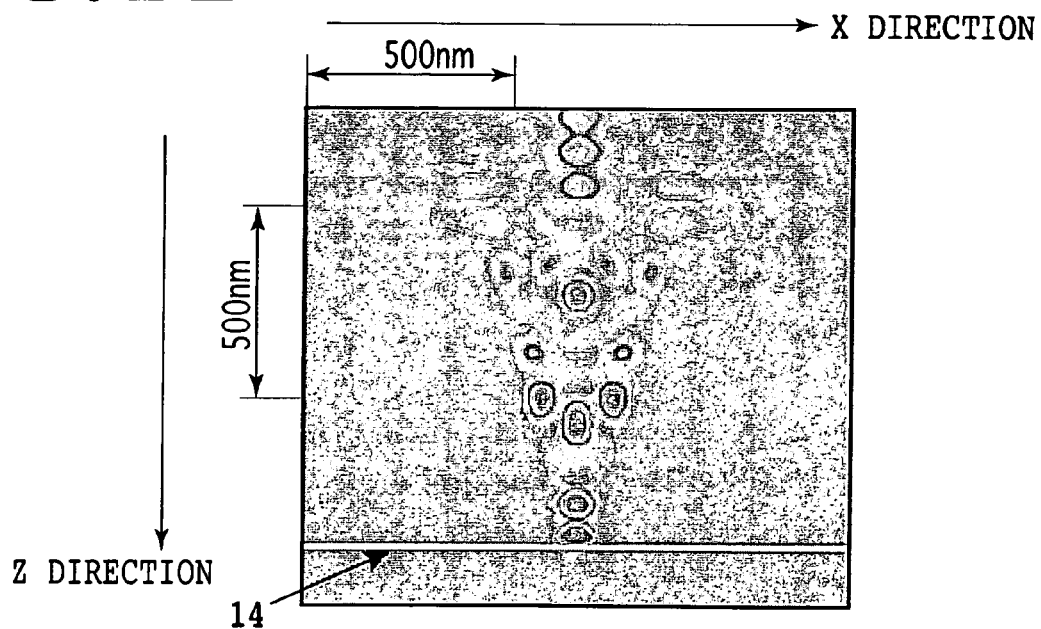
FIG. 12 is a computer simulation image in the X direction when light is incident on the optical head according to the first embodiment of the present invention.
Figure 13:
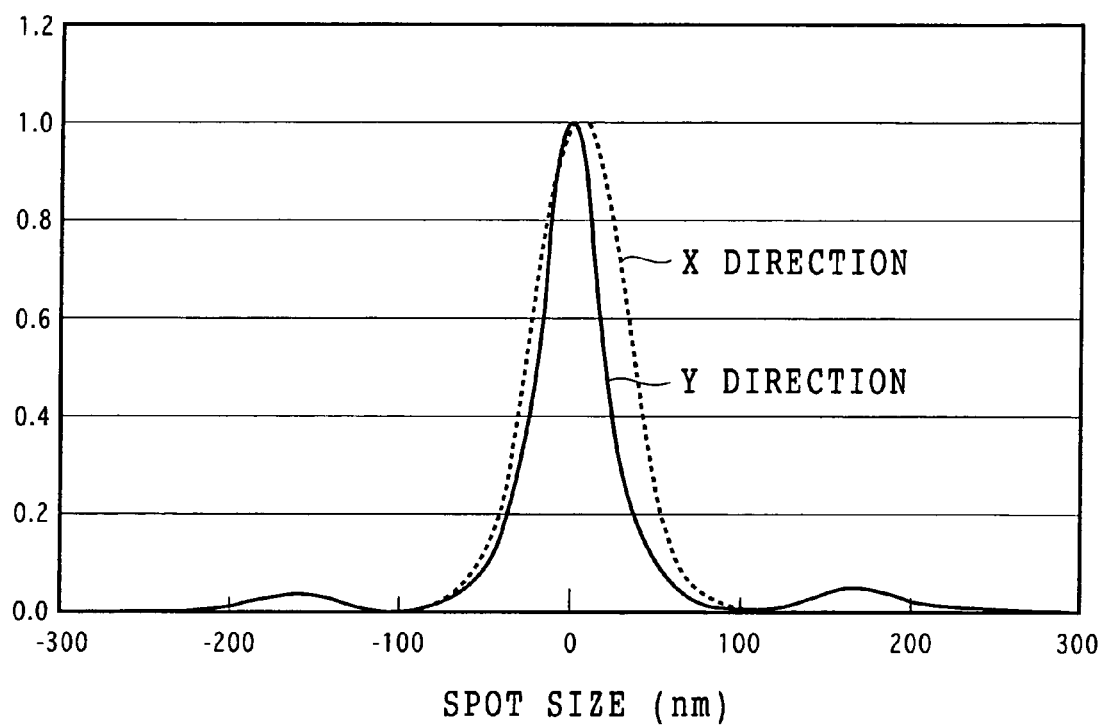
FIG. 13 is a beam profile at a distance of 10 nm from a light emerging surface of the optical head according to the first embodiment.

FIGS. 11 and 12 show computer simulation images of propagation of light in the first preferred embodiment. More specifically, FIG. 11 shows the computer simulation image in the Y direction, and FIG. 12 shows the computer simulation image in the X direction. As apparent from FIGS. 11 and 12, the light propagates in the central opening 8 having a thickness of 20 nm without attenuation, but with the intensity being increased. FIG. 13 shows a beam profile at a distance of 10 nm from the light emerging surface 14 in this preferred embodiment. The beam diameter for a light intensity of $1/e^2$ at the distance of 10 nm from the light emerging surface 14 is 100 nm in the X direction and 86 nm in the Y direction, and the full width at half maximum is 66×40 nm. Thus, the beam diameter is greatly reduced in this preferred embodiment. Further, the ratio of the emergent light quantity to the incident light quantity to the optical head 2, i.e., the light use efficiency becomes as high as 2.4%. Thus, sufficient characteristics as an optical head for a large-capacity optical storage can be obtained.

According to this preferred embodiment, the refractive index difference Δn between the adjacent dielectric layers is large, so that a sufficient light use efficiency can be attained in spite of a small number of layers in the multilayer structure. However, in the structure that a central dielectric layer having a low refractive index is sandwiched between a pair of dielectric layers each having a high refractive index as shown in FIG. 6, light cannot be transmitted through the optical head as shown in FIG. 7. To the contrary, this preferred embodiment has a multilayer structure having three periods, wherein light propagates in the central opening without attenuation, but with the light intensity being increased, and emerges from the light emerging surface. However, it should be noted that the periodic structure having three periods has a special periodicity such that the period length (pitch) or refractive index in the central combination of dielectric layers is different from that in the other combination of dielectric layers located on both sides of the central combination. While this preferred embodiment employs the Al layer 12, intense transmitted light can be obtained without the Al layer 12.

In this preferred embodiment, the first dielectric layer 8 is formed of diamond, the second dielectric layers 10 and the fourth dielectric layers 32 are formed of Si, and the third dielectric layers 30 are formed of $SiO_2$. However, the materials of these dielectric layers are not limited to the above. It is essential that each of the second dielectric layers 10 and the fourth dielectric layers 32 has a refractive index larger than that of the first dielectric layer 8 and that each of the third dielectric layers 30 has a refractive index or thickness different from that of the first dielectric layer 8. Preferably, each of the third dielectric layers 30 has a refractive index smaller than that of the first dielectric layer 8. Alternatively, each of the third dielectric layers 30 has a thickness larger than that of the first dielectric layer 8. Further, the refractive index difference between the first dielectric layer 8 and each of the second dielectric layers 10 is preferably greater than or equal to 2.

The refractive index difference between the dielectric layers may be obtained by making the materials of the dielectric layers different from each other. It is sufficient that the refractive index difference between the dielectric layer having a low refractive index and the dielectric layer having a high refractive index is greater than or equal to 0.1. However, it is effective to make the refractive index difference greater. Further, it is sufficient that the difference in thickness between the dielectric layers is small. More specifically, it is effective to select the thickness difference in the range of several nanometers to hundreds of nanometers.

The diffraction grating having a multilayer structure as in this preferred embodiment may be regarded as a one-dimensional photonic crystal in a broad sense. In the case that the polarization direction of incident light is orthogonal to the layering direction in the multilayer structure, the transmittance of light in the multilayer structure is large. Thus, the transmittance of light is dependent on the polarization direction of light. In such a transmission phenomenon, the transmitted light generally shows substantially periodical loops and nodes of intensity in the traveling direction, and the period in this case is about λ/2n where n is the refractive index of a medium through which the light is transmitted. In many cases, a so-called Fabry-Perot resonance mode is established. Examples of a medium having a high refractive index and a low loss include $KNbO_3$, $LiNbO_3$, AgBr, TlCl, ZnS, KPS-6, ESO, and $TiO_2$.

While the optical element (optical head) according to this preferred embodiment includes the trapezoidal prism 4 in which a special periodic structure is formed, the present invention is not limited to such an optical element including a trapezoidal prism. For example, parallel light or convergent spherical wave produced by a normal lens or the like may be made incident on an optical element having a special periodic structure as mentioned above, thereby similarly allowing a great reduction in beam diameter in one direction.

Figure 14:
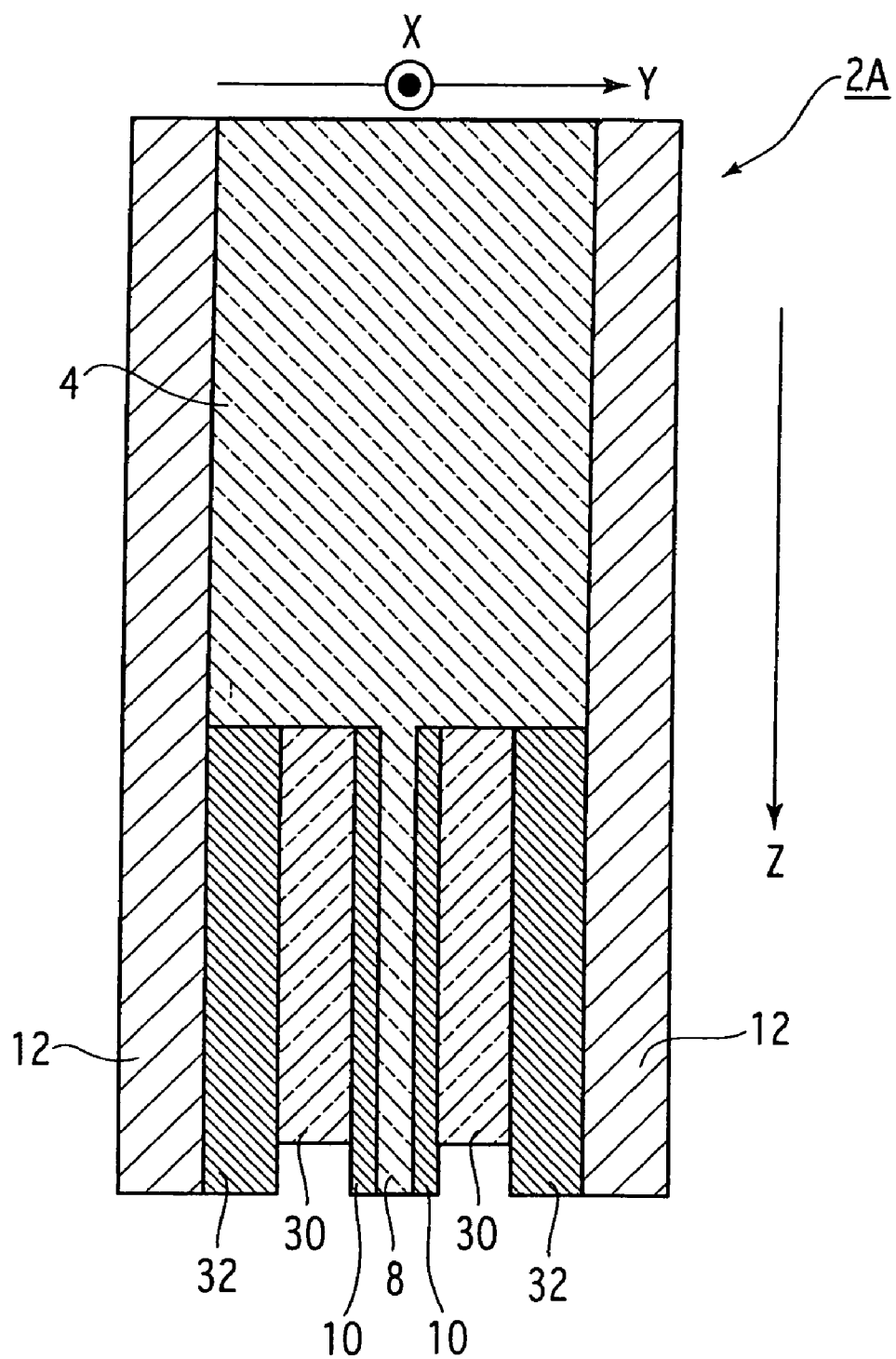
FIG. 14 is a sectional view of an optical head according to a second preferred embodiment of the present invention as taken in the Y direction.

Referring to FIG. 14, there is shown a sectional view of an optical head 2A according to a second preferred embodiment of the present invention. In this preferred embodiment, each of the third dielectric layers 30 is cut off by a predetermined distance from the light emerging surface. In the case that each of the third dielectric layers 30 is formed of $SiO_2$ and has a thickness W, each of the third dielectric layers 30 is cut off by a distance almost equal to the thickness W from the light emerging surface in the Z direction by etching of $SiO_2$. The thickness W is about 50 to 100 nm. With this configuration, the leakage of weak light from the third dielectric layers 30 can be prevented.

Figure 15:
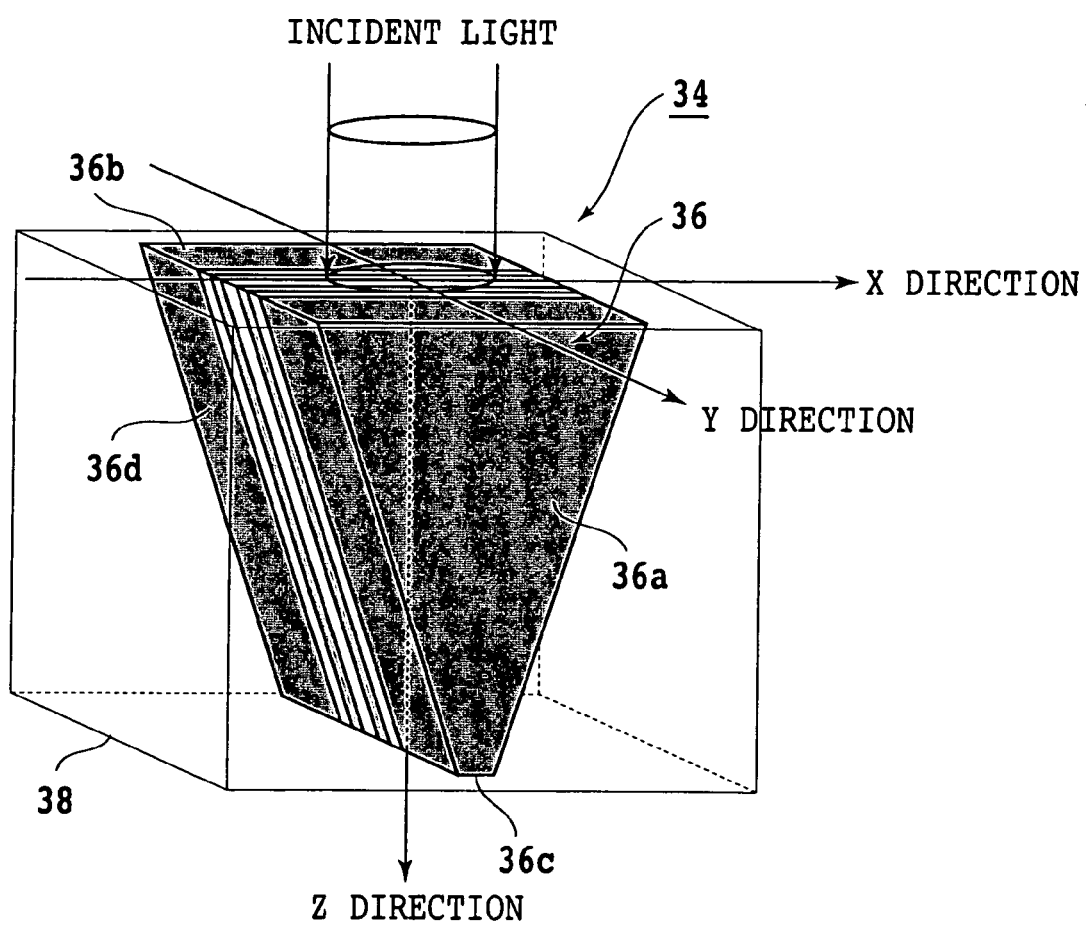
FIG. 15 is a perspective view of an optical head according to a third preferred embodiment of the present invention.
Figure 16:
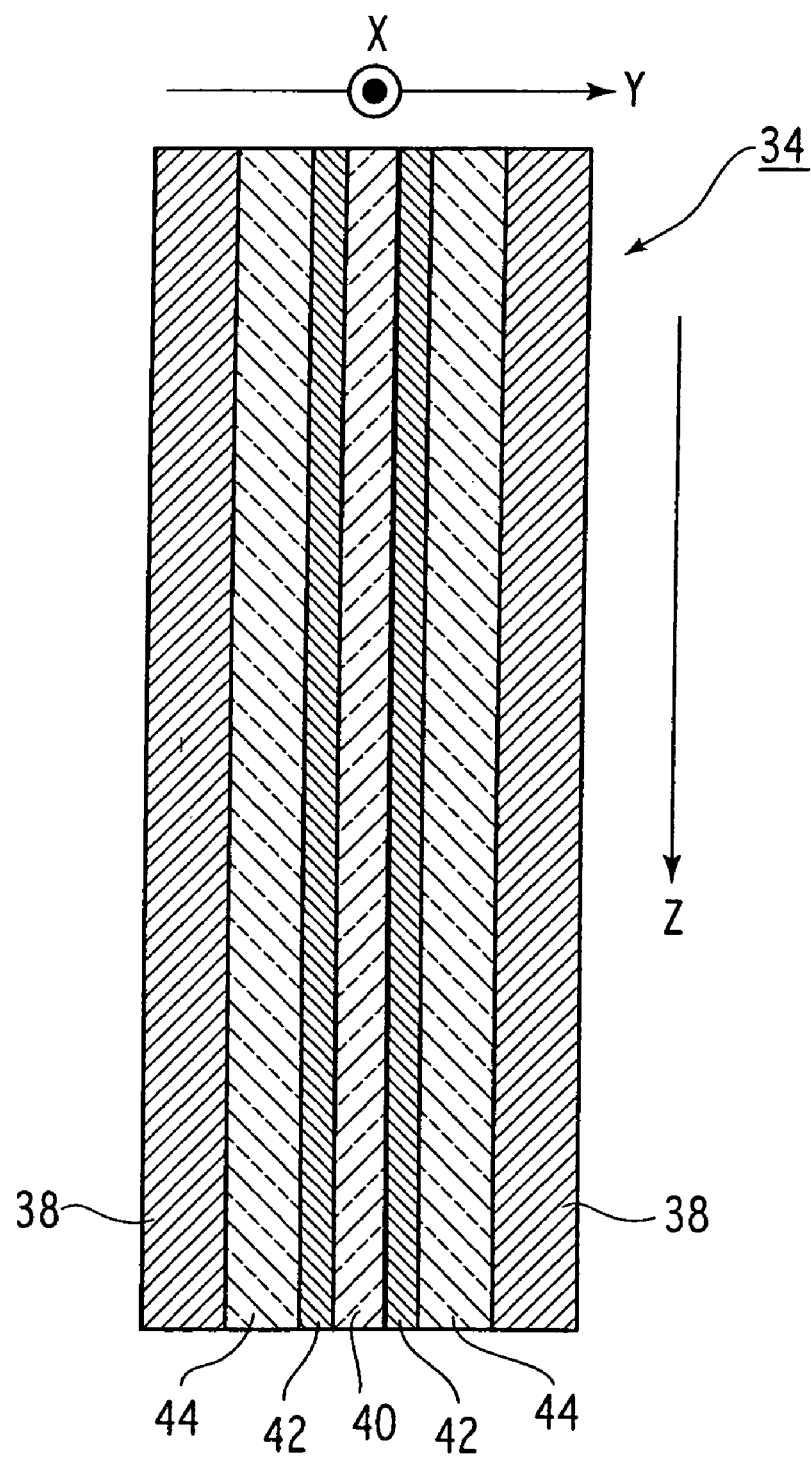
FIG. 16 is a sectional view of the optical head according to the third embodiment as taken in the Y direction.

Referring to FIG. 15, there is shown a perspective view of an optical head 34 according to a third preferred embodiment of the present invention. FIG. 16 is a sectional view of the optical head 34 taken in the Y direction shown in FIG. 15. The optical head 34 includes a trapezoidal prism 36 having a pair of trapezoidal principal surfaces 36a parallel to each other, a rectangular bottom surface 36b, a rectangular top surface 36c parallel to the rectangular bottom surface 36b, and a pair of inclined side surfaces 36d connecting the top surface 36c, the bottom surface 36b, and the principal surfaces 36a together. The apex angle at the top of the trapezoidal prism 36 is 30°. In this preferred embodiment, a multilayer structure is formed over the length of the optical head (optical element) 34 in the Z direction.

As shown in FIG. 16, a first dielectric layer 40 formed of $SiO_2$ is located at the center of the optical head 34. The first dielectric layer 40 has a thickness of 20 nm. A pair of first metal layers 42 formed of Al are located adjacent to the first dielectric layer 40 on both sides thereof. Each of the first metal layers 42 has a thickness of 30 nm. A pair of second dielectric layers 44 formed of diamond are located adjacent to the first metal layers 42. Each of the second dielectric layers 44 has a thickness of 160 nm. A pair of second metal layers 38 formed of Al are located adjacent to the second dielectric layers 44. Each of the second metal layers 38 has a thickness of 200 nm. In this preferred embodiment, metal is used as a material for shielding light. To increase the light intensity by the resonance of free electrons of metal at the operating wavelength, the first metal layers 42 and the second metal layers 38 are required to satisfy the plasmon presence condition. In other words, it is necessary that the absolute value of the real part of the dielectric constant of the metal is greater than the dielectric constant of the adjacent dielectric. In this preferred embodiment, aluminum (Al) satisfying this condition is used as the first and second metal layers 42 and 38. The first dielectric layer 40 and the second dielectric layers 44 are transparent to the light to be used.

Figure 17:
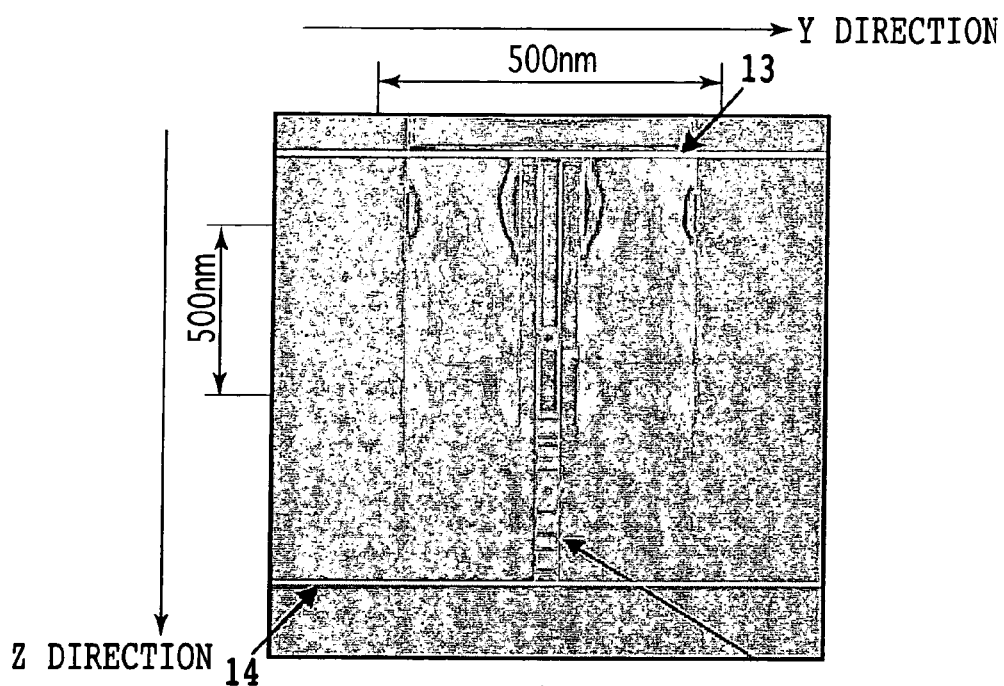
FIG. 17 is a computer simulation image in the Y direction when light is incident on the optical head according to the third embodiment.
Figure 18:
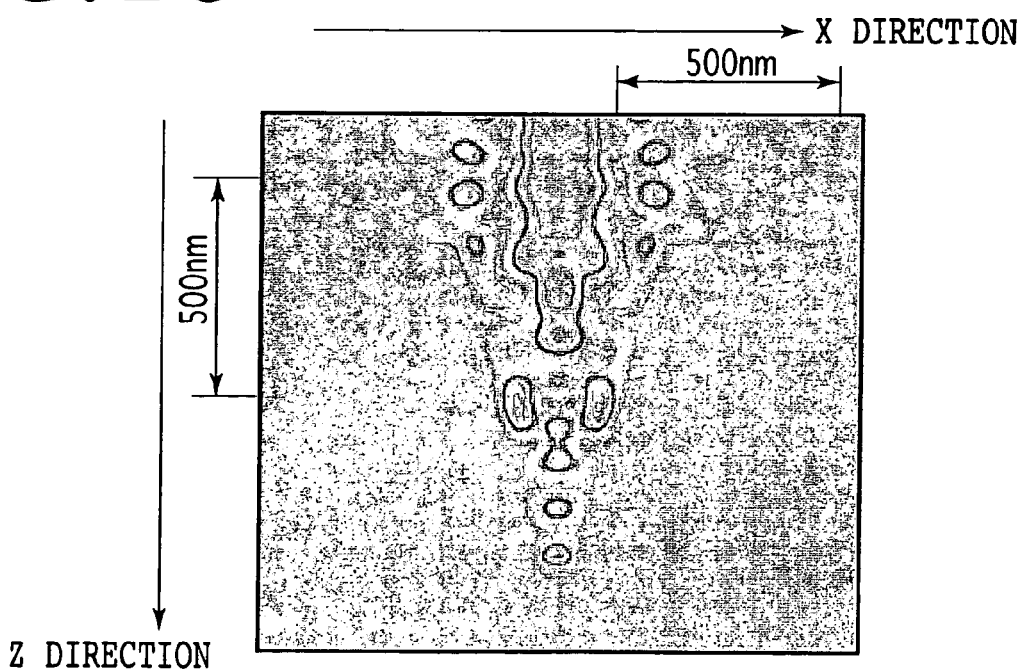
FIG. 18 is a computer simulation image in the X direction when light is incident on the optical head according to the third embodiment.
Figure 19:
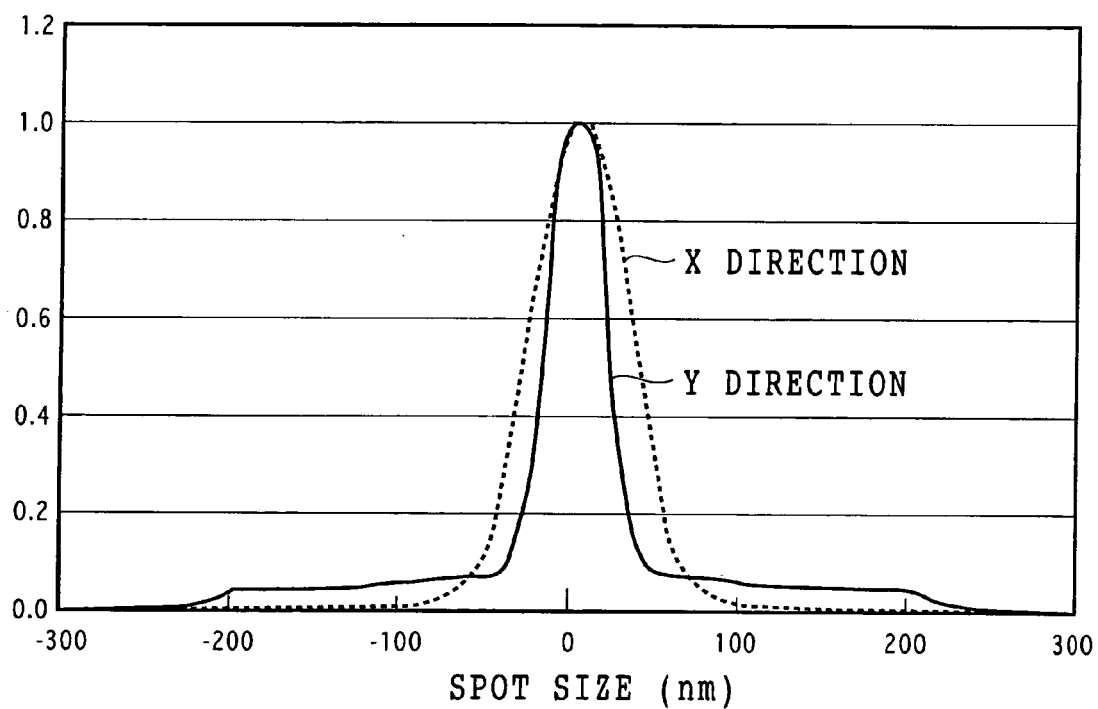
FIG. 19 is a beam profile at a distance of 10 nm from a light emerging surface of the optical head shown in FIG. 15.

FIGS. 17 and 18 show computer simulation images of propagation of light incident on the optical head 34 in the third preferred embodiment. More specifically, FIG. 17 shows the computer simulation image in the Y direction, and FIG. 18 shows the computer simulation image in the X direction. As apparent from FIGS. 17 and 18, the light propagates in the first dielectric layer 40 having a very small thickness of 20 nm without attenuation. FIG. 19 shows a beam profile at a distance of 10 nm from the light emerging surface 14 in this preferred embodiment. The beam diameter for a light intensity of $1/e^2$ at the distance of 10 nm from the light emerging surface 14 is 100 nm in the X direction and 71 nm in the Y direction, and the full width at half maximum is 65×37 nm. Thus, the beam diameter is greatly reduced in this preferred embodiment. Further, the light use efficiency in this preferred embodiment is as high as 0.94%. Thus, sufficient characteristics as an optical head for a large-capacity optical storage can be obtained.

While aluminum is used as each metal layer in this preferred embodiment, any other metals having negative dielectric constants may be used. However, it is necessary that the absolute value of the real part of the dielectric constant of each metal layer is greater than the dielectric constant of the adjacent dielectric layer. Preferably, each of the second dielectric layers 44 has a refractive index greater than that of the first dielectric layer 40. Alternatively, each of the second dielectric layers 44 has a thickness greater than that of the first dielectric layer 40. As a modification of this preferred embodiment, a multilayer structure of dielectric layers as in the first or second preferred embodiment may be adopted. As a modification of the first or second preferred embodiment, metal layers such as aluminum (Al) layers may be used as the member for shielding light in place of the dielectric layers 10.

Figure 20:
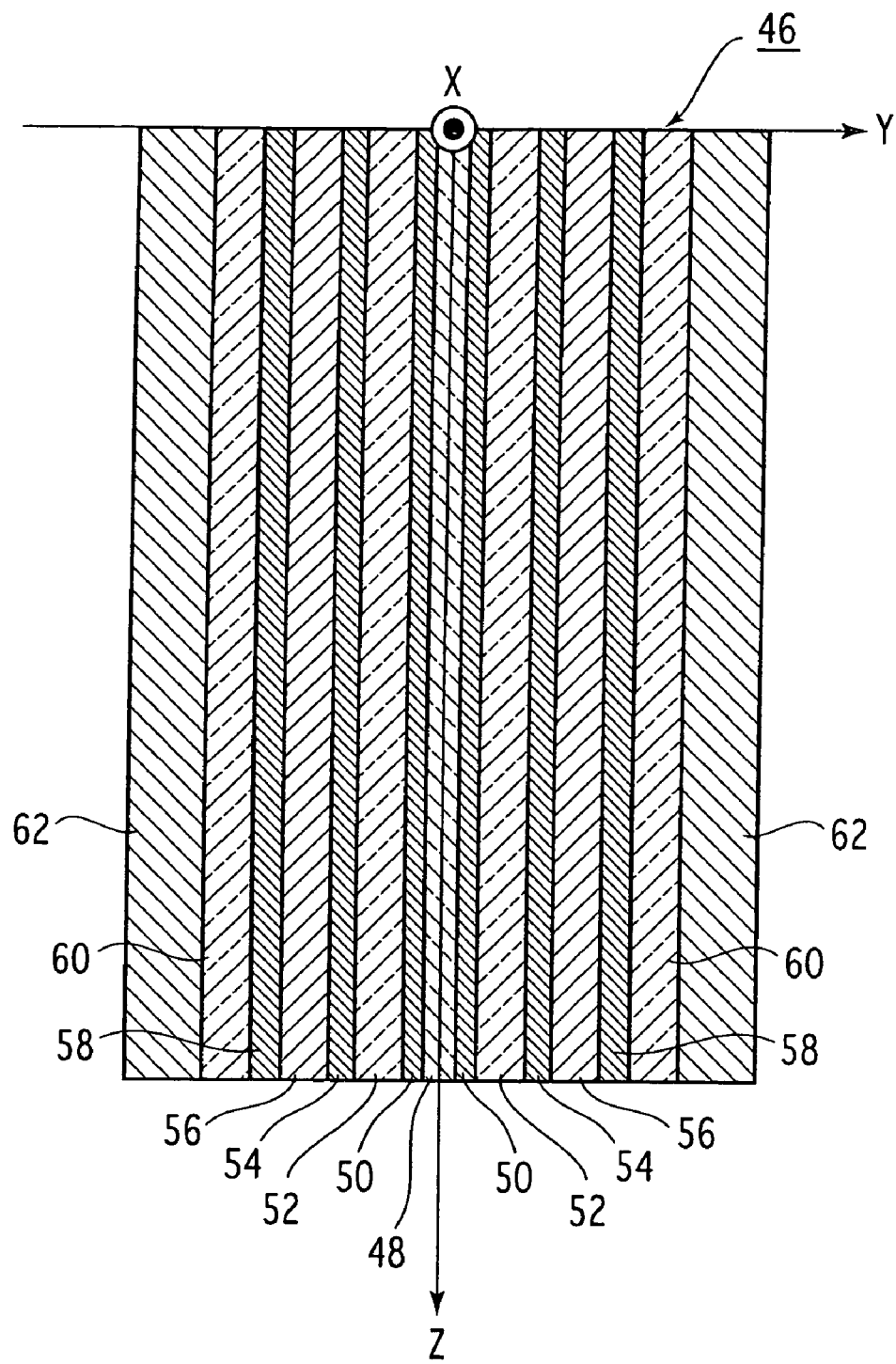
FIG. 20 is a sectional view of an optical head according to a fourth preferred embodiment of the present invention as taken in the Y direction.

FIG. 20 shows a schematic sectional view of an optical head 46 according to a fourth preferred embodiment of the present invention. In this preferred embodiment, the multilayer structure in the optical head 46 has an increased number of periods. That is, a first dielectric layer 48 formed of diamond is located at the center of the optical head 46. A pair of second dielectric layers 50 are formed of Si. A pair of third dielectric layers 52 are formed of $SiO_2$ and a pair of fourth dielectric layers 54 are formed of Si. Thus, the multilayer structure of the first to fourth dielectric layers 48 to 54 is similar to that of the first preferred embodiment shown in FIG. 10. In addition, a pair of fifth dielectric layers 56 are formed of Si and a pair of sixth dielectric layers 58 are formed of Si. Further a pair of seventh dielectric layers 60 are formed of $SiO_2$ and a pair of eighth dielectric layers 62 are formed of Si.

One of the features of the optical head 46 is that the fifth dielectric layers 56 are formed of a material having a high refractive index to block the transmission of light at this portion. In fabricating the optical head 46, the fourth to sixth dielectric layers 54 to 58 are formed by one film deposition step. In the case that the light is transmitted through a plurality of slits as shown in FIG. 9, there occurs a phenomenon such that the intensity of the light transmitted through the third slits counted from the center slit becomes higher. This preferred embodiment is intended to prevent this phenomenon. In this case, the intensity of transmitted light can be increased by increasing the number of periods of the diffraction gratings. The fifth dielectric layers 56 may be replaced by a pair of metal layers each having a negative dielectric constant.

Figure 21:
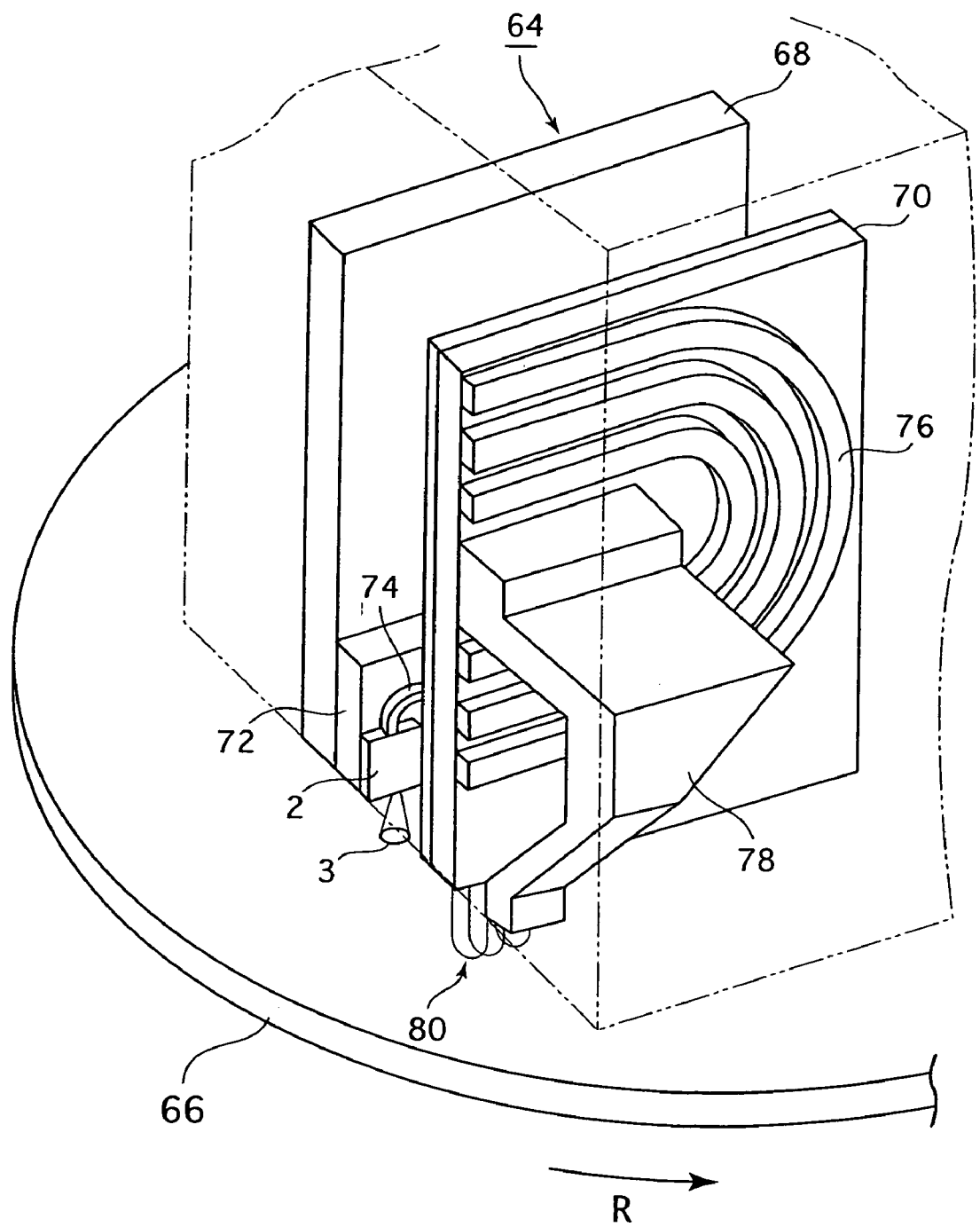
FIG. 21 is a schematic perspective view of an information recording/reproducing device using the optical head according to the present invention.

Referring to FIG. 21, there is shown a schematic perspective view of an information recording/reproducing device 64 using the optical head according to the present invention. This information recording/reproducing device 64 is a light assisted magnetic recording/reproducing device. A magnetic recording medium 66 is rotated in the direction shown by the arrow R. A magnetic sensor head 72 for reproducing information and the optical head 2 are formed between a lower magnetic shield 68 and an upper magnetic shield 70. The upper magnetic shield 70 serves also as a lower core. Light is introduced through an optical waveguide 74 into the optical head 2. A coil 76 for writing information is formed on the lower core 70. Reference numeral 78 denotes an upper core.

By the rotation of the magnetic recording medium 66, a mark is sequentially passed by the magnetic sensor head 72, the optical head 2, and the coil 76 for generating a magnetic field in this order. In writing information, light 3 emerged from the optical head 2 is directed onto the magnetic recording medium 66 to raise the temperature of the magnetic recording medium 66. Immediately after this temperature rise, information is written by a magnetic field 80 generated from the coil 76. Accordingly, information can be written on the magnetic recording medium 66 with a relatively small magnetic field strength. The information recording/reproducing device 64 can be manufactured as a completely integral head by a wafer process.

While the optical head according to the present invention is applied to the light assisted magnetic recording/reproducing device as the information recording/reproducing device, the application of the optical head according to the present invention is not limited to the above. For example, since a minute beam spot can be formed by the optical head according to the present invention, the optical head is applicable also to a phase-change type optical disk drive or a magneto-optical disk drive. Particularly in the case of a magneto-optical disk drive, so-called crescent recording can be performed in the circumferential direction of a disk by magnetic field laser pulse modulation, thereby allowing a reduction in recording length to increase a recording density. Further, overwrite recording can be performed by magnetic field laser pulse modulation, thereby allowing high-speed recording/reproduction.

Figure 22:
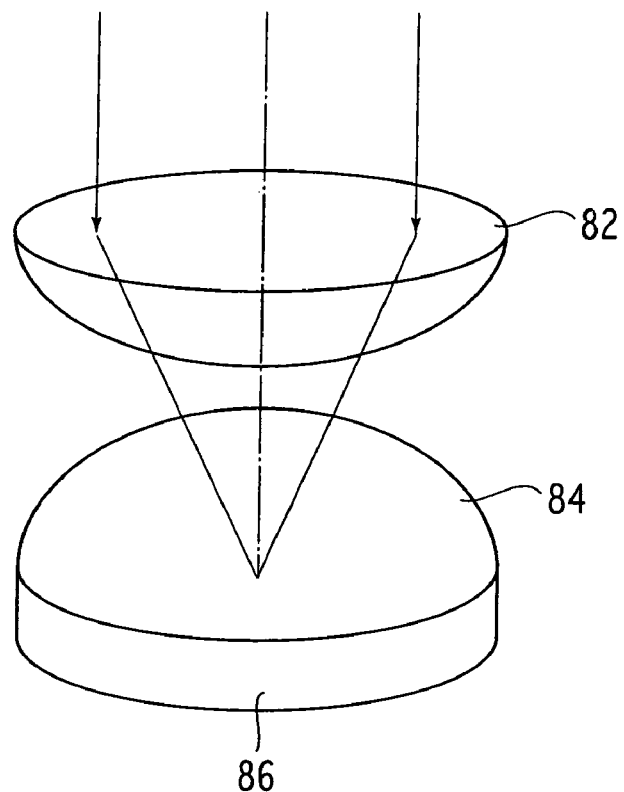
FIG. 22 is a perspective view of an optical head according to another preferred embodiment of the present invention.

FIG. 22 shows another preferred embodiment of the present invention. A light beam is converged by an objective lens 82 to enter a solid immersion lens 84. This converged light beam is further converged by the solid immersion lens 84. The solid immersion lens 84 is a semispherical lens, and a cylindrical optical head 86 according to a fifth preferred embodiment of the present invention is formed on a flat portion of the semispherical lens 84. The cylindrical optical head 86 is specifically shown in FIG. 23. As shown in FIG.

23, the cylindrical optical head 86 includes a first dielectric 88 located at the center of the optical head, a ring-like second dielectric 90 located adjacent to the first dielectric 88 on the outer circumferential side thereof, a ringlike third dielectric 92 located adjacent to the second dielectric 90 on the outer circumferential side thereof, and a ringlike fourth dielectric 94 located adjacent to the third dielectric 92 on the outer circumferential side thereof. The cylindrical optical head 86 further includes a ringlike fifth dielectric 95 located adjacent to the fourth dielectric 94 on the outer circumferential side thereof, and a ringlike sixth dielectric 96 located adjacent to the fifth dielectric 95 on the outer circumferential side thereof. The first dielectric 88 is formed of diamond, and the ring-like second, fourth, and sixth dielectrics 90, 94, and 96 are formed of Si. Further, the ringlike third and fifth dielectrics 92 and 95 are formed of $SiO_2$.

Figure 23:
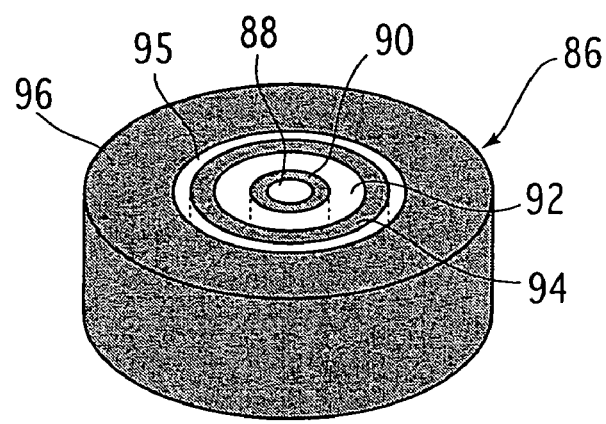
FIG. 23 is a perspective view of a cylindrical optical head according to a fifth preferred embodiment of the present invention used in the optical head shown in FIG. 22.

As a modification of the cylindrical optical head 86 shown in FIG. 23, the central portion 88 may be formed of $SiO_2$, the ringlike portions 90, 94, and 96 may be formed of metal such as aluminum, and the ring-like portions 92 and 95 may be formed of diamond. According to the fifth preferred embodiment shown in FIG. 23, the incident light beam can be reduced in size in all the directions.

Figure 24:
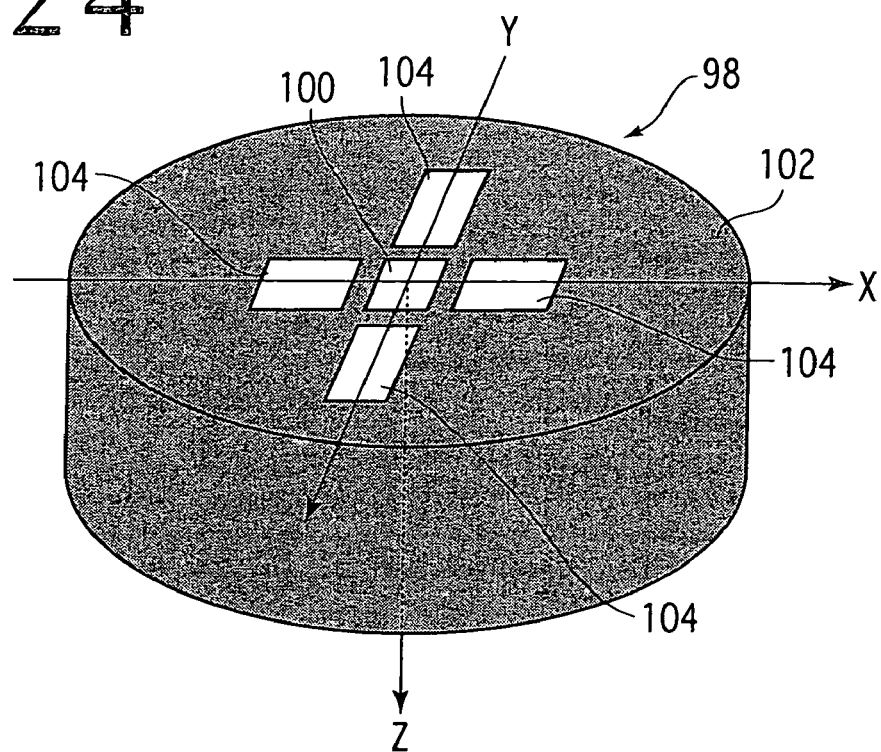
FIG. 24 is a perspective view of an optical head according to a sixth preferred embodiment of the present invention.
Figure 25:
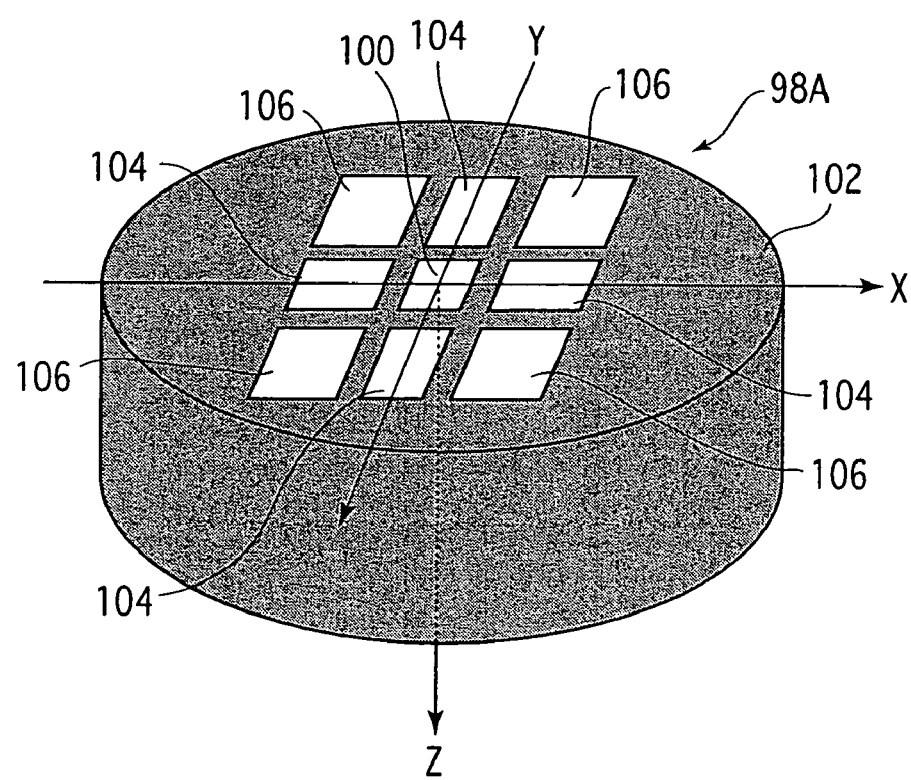
FIG. 25 is a perspective view showing a modification of the sixth preferred embodiment.

FIG. 24 shows an optical head 98 according to a sixth preferred embodiment of the present invention. The optical head 98 is configured so that a rectangular prism 100 formed of diamond is located at the center of a cylindrical member 102 formed of Si, and rectangular prisms 104 formed of $SiO_2$ are located like a grid around the rectangular prism 100. The cylindrical member 102 may be formed of metal such as aluminum. In this case, it is preferable that the central rectangular prism 100 is formed of $SiO_2$ and the peripheral rectangular prisms 104 are formed of diamond. FIG. 25 shows an optical head 98A according to a modification of the sixth preferred embodiment shown in FIG. 24. In this modification, four rectangular prisms 106 formed of $SiO_2$ are formed in addition to the rectangular prisms 104 shown in FIG. 24. According to the preferred embodiments shown in FIGS. 24 and 25, the beam size can be reduced both in the X direction and in the Y direction.

Figure 26:
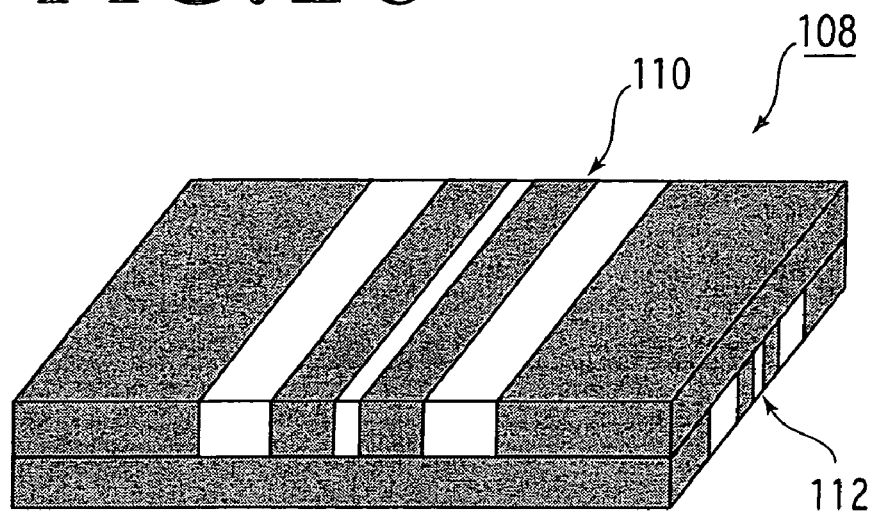
FIG. 26 is a perspective view of an optical head according to a seventh preferred embodiment of the present invention.

FIG. 26 shows an optical head 108 according to a seventh preferred embodiment of the present invention. The optical head 108 is configured by stacking two orthogonal diffraction gratings 110 and 112. Also according to this preferred embodiment, the beam size can be reduced both in the X direction and in the Y direction.

Figure 27:
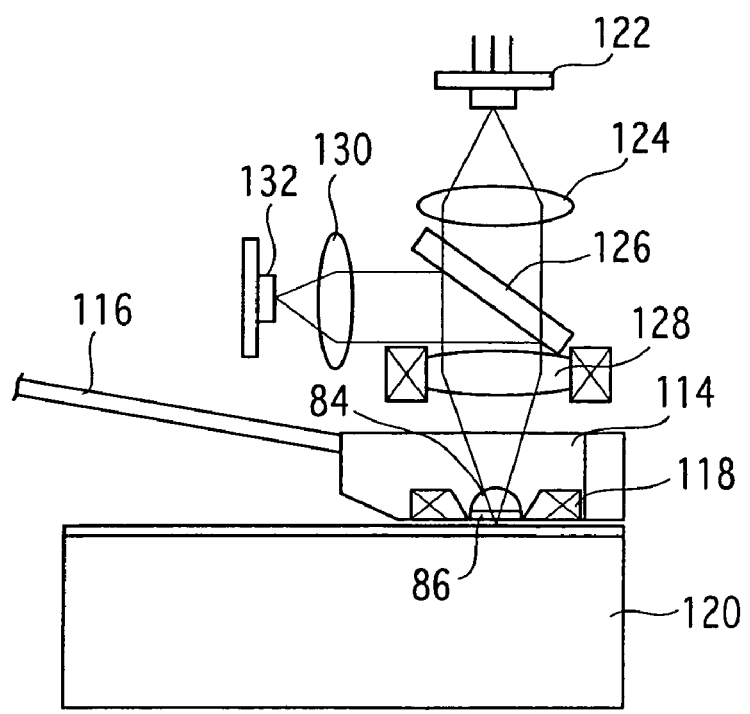
FIG. 27 is a schematic view showing the configuration of an information recording/reproducing device using the optical head shown in FIG. 22.

FIG. 27 shows a schematic configuration of a magneto-optical disk drive to which the preferred embodiment shown in FIG. 22 is applied. A coil 118 for magnetic modulation, the solid immersion lens 84, and the cylindrical optical head 86 are formed on a slider 114 supported to a suspension 116. Reference numeral 120 denotes a magneto-optical disk medium. A laser beam emitted from a laser diode (LD) 122 is collimated by a collimator lens 124. The collimated beam is transmitted through a polarization beam splitter 126, and is next focused onto the magneto-optical disk medium 120 by means of an objective lens 128, the solid immersion lens 84, and the cylindrical optical head 86. In writing information, the coil 118 is modulated according to data to be written, and the data is written on the magneto-optical disk medium 120. In reading information, reflected light from the magneto-optical disk medium 120 is reflected by the polarization beam splitter 126, and is next focused on a photodetecting element 132 by a lens 130 to thereby detect a magneto-optical signal.

By fabricating the optical element (optical head) according to the present invention on a light emitting surface as of an LD or LED, the convergence of light can be improved to thereby allow the manufacture of an efficient optical device. Further, by forming the optical element according to the present invention on the end face of an optical waveguide, the optical element can be used as a coupling element to an optical fiber for communication or to optical wiring.

Figure 28A:
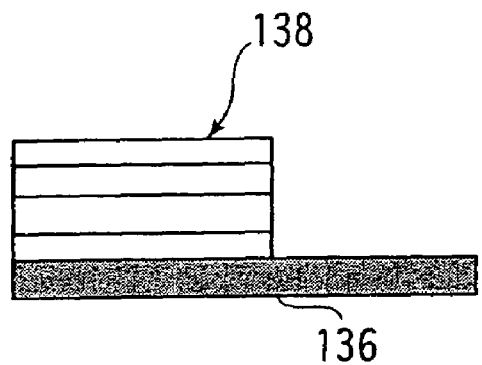
FIGS. 28A to 28C are schematic side views showing a manufacturing process for the optical head according to the first preferred embodiment.
Figure 28B:
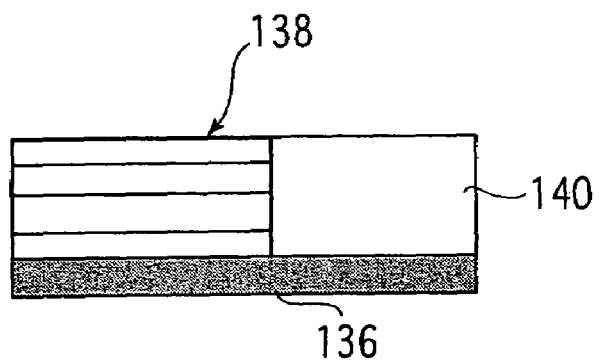
Figure 28C:
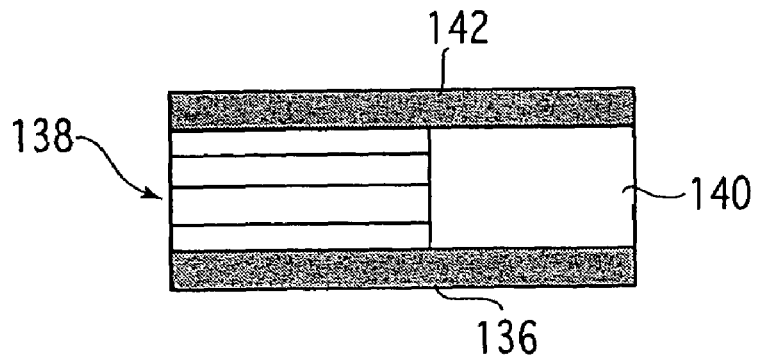

FIGS. 28A to 28C show a manufacturing method for the optical head 2 according to the first preferred embodiment shown in FIG. 3. As shown in FIG. 28A, an Al layer 136 and a multilayer structure 138 are formed by sputtering, vacuum evaporation, or CVD. As shown in FIG. 28B, a trapezoidal prismatic light transmitting portion 140 of diamond is next formed on the Al layer 136. As shown in FIG. 28C, an Al layer 142 is finally formed on the multilayer structure 138 and the trapezoidal prism 140.

Figure 29A:
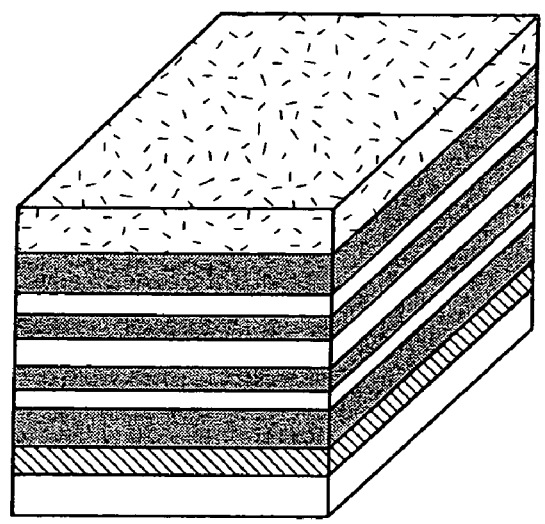
FIGS. 29A to 29D are schematic perspective views showing a manufacturing process for the optical head according to the third preferred embodiment.
Figure 29B:
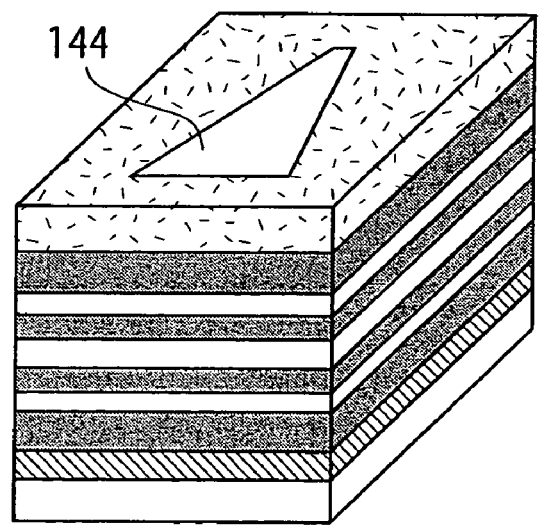
Figure 29C:
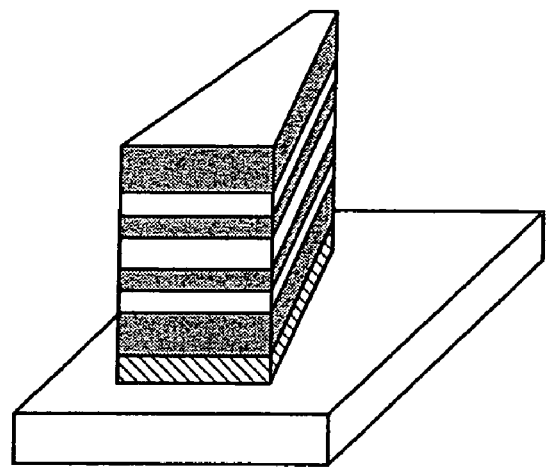
Figure 29D:
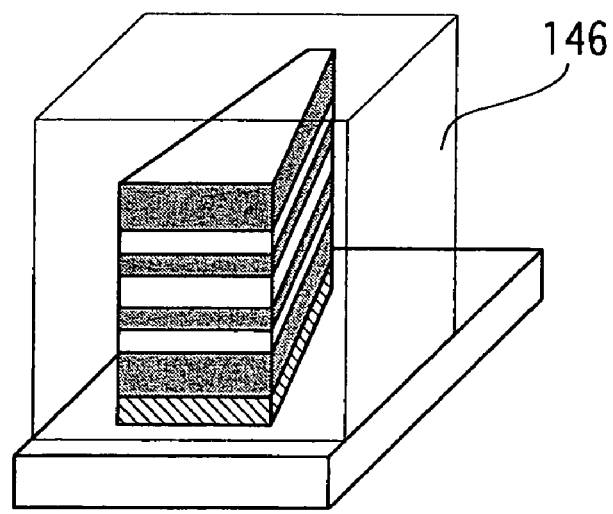

FIGS. 29A to 29D show a manufacturing method for the optical head 34 according to the third preferred embodiment shown in FIG. 15. As shown in FIG. 29A, a multilayer structure is formed by RF sputtering, vacuum evaporation, or CVD. As shown in FIG. 29B, a trapezoidal pattern 144 is next formed by first applying a photoresist and next using a stepper or an electron beam lithographic device, for example. As shown in FIG. 29C, a trapezoidal prism is next formed by reaction ion etching (RIE) or the like. As shown in FIG. 29D, a surrounding Al layer 146 is finally formed. These process steps are performed as a wafer process. Finally, the wafer is cut into chips, and each chip is then polished to obtain a given surface.

The apex angle of the trapezoidal prism in each preferred embodiment mentioned above may be suitably selected in the range of 10° to 120° according to a manufacture aspect and beam design. The material of each layer is not limited to that used in each preferred embodiment, but may be suitably selected according to a manufacture aspect, material cost, and beam design. For example, $SiO_2$ may be replaced by $SiO_2$-base materials containing $SiO_2$, and Al may be replaced by Al-base materials containing Al.

The optical head according to the present invention can emerge a minute light beam as described above, so that ultrahigh-density recording can be realized by applying the optical head to an information recording/reproducing device. Further, the optical head capable of emerging a minute light beam can be easily manufactured by using a two-dimensional pattern formed on a substrate, so that mass production of the optical head is allowed. Further, the optical head can be fabricated in combination with a read head by lithography, so that it is possible to provide an optical head and an information recording/reproducing device using the same which can support high-density recording of not less than subterabits per square inch.

In addition, the optical head according to the present invention is applicable not only to an information storage device, but also to optical communication components and optical devices such as a semiconductor fabrication device.

What is claimed is:
1. An optical head comprising:
a first dielectric layer having a first refractive index;
a pair of second dielectric layers located adjacent to said first dielectric layer on both sides thereof, each of said second dielectric layers having a second refractive index larger than said first refractive index;
a pair of third dielectric layers located adjacent to said second dielectric layers; and
a pair of fourth dielectric layers located adjacent to said third dielectric layers, each of said fourth dielectric layers having a third refractive index larger than said first refractive index;

wherein light is incident on said optical head in a direction orthogonal to a layering direction of said first to fourth dielectric layers.

2. The optical head according to claim 1, wherein said first dielectric layer and each of said third dielectric layers have different refractive indices.

3. The optical head according to claim 2, wherein each of said third dielectric layers has a fourth refractive index smaller than said first refractive index.

4. The optical head according to claim 1, wherein said second dielectric layers and said fourth dielectric layers are formed of the same dielectric.

5. The optical head according to claim 1, wherein said second and fourth dielectric layers are formed of silicon, and said third dielectric layers are formed of $SiO_2$.

6. The optical head according to claim 4, further comprising:
a pair of fifth dielectric layers located adjacent to said fourth dielectric layers and formed of the same dielectric as that of said third dielectric layers; and
a pair of sixth dielectric layers located adjacent to said fifth dielectric layers and formed of the same dielectric as that of said second dielectric layers.

7. The optical head according to claim 1, wherein said optical head has an incident end surface from which the light enters and an emergent end surface from which the light emerges; and
each of said third dielectric layers is cut off by a predetermined distance from said emergent end surface.

8. The optical head according to claim 1, wherein said incident light is linearly polarized light having a polarization plane in a direction orthogonal to the layering direction of said first to fourth dielectric layers.

9. An optical head comprising:
a first dielectric layer;
a pair of first adjacent layers located adjacent to said first dielectric layer on both sides thereof, each of said first adjacent layers having a negative dielectric constant;
a pair of second dielectric layers located adjacent to said first adjacent layers; and
a pair of second adjacent layers located adjacent to said second dielectric layers, each of said second adjacent layers having a negative dielectric constant;
wherein said first dielectric layer and each of said second dielectric layers have different refractive indices or different thicknesses, and light is incident on said optical head in a direction orthogonal to a layering direction of said first and second dielectric layers and said first and second adjacent layers.

10. The optical head according to claim 9, wherein said first dielectric layer has a first refractive index, and each of said second dielectric layers has a second refractive index larger than said first refractive index.

11. The optical head according to claim 9, wherein said first and second adjacent layers are formed of the same metal material.

12. The optical head according to claim 11, wherein said first dielectric layer is formed of $SiO_2$, and said first and second adjacent layers are formed of aluminum.

13. The optical head according to claim 9, further comprising:
a pair of third dielectric layers located adjacent to said second adjacent layers; and
a pair of third adjacent layers located adjacent to said third dielectric layers.

14. The optical head according to claim 9, wherein said optical head has an incident end surface from which the light enters and an emergent end surface from which the light emerges; and
each of said second dielectric layers is cut off by a predetermined distance from said emergent end surface.

15. The optical head according to claim 9, wherein said incident light is linearly polarized light having a polarization plane in a direction orthogonal to the layering direction of said first and second dielectric layers and said first and second adjacent layers.

16. An information storage device for recording/reproducing information to/from a recording medium, comprising:
a light source for emitting a light beam; and
an optical head for irradiating said recording medium with light based on said light beam;
said optical head comprising:
a first dielectric layer having a first refractive index;
a pair of second dielectric layers located adjacent to said first dielectric layer on both sides thereof, each of said second dielectric layers having a second refractive index larger than said first refractive index;
a pair of third dielectric layers located adjacent to said second dielectric layers; and
a pair of fourth dielectric layers located adjacent to said third dielectric layers, each of said fourth dielectric layers having a third refractive index larger than said first refractive index;
wherein light is incident on said optical head in a direction orthogonal to a layering direction of said first to fourth dielectric layers.

17. An information storage device for recording/reproducing information to/from a recording medium, comprising:
a light source for emitting a light beam; and
an optical head for irradiating said recording medium with light based on said light beam;
said optical head comprising:
a first dielectric layer;
a pair of first adjacent layers located adjacent to said first dielectric layer on both sides thereof, each of said first adjacent layers having a negative dielectric constant;
a pair of second dielectric layers located adjacent to said first adjacent layers; and
a pair of second adjacent layers located adjacent to said second dielectric layers, each of said second adjacent layers having a negative dielectric constant;
wherein said first dielectric layer and each of said second dielectric layers have different refractive indices or different thicknesses, and light is incident on said optical head in a direction orthogonal to a layering direction of said first and second dielectric layers and said first and second adjacent layers.

* * * * *